(12) United States Patent
Goldman

(10) Patent No.: US 7,191,736 B2
(45) Date of Patent: Mar. 20, 2007

(54) LOW EMISSION ENERGY SOURCE

(75) Inventor: Arnold J. Goldman, Jerusalem (IL)

(73) Assignee: Los Angeles Advisory Services, Inc., Napa, CA (US)

( * ) Notice: Subject to any disclaimer, the term of this patent is extended or adjusted under 35 U.S.C. 154(b) by 259 days.

(21) Appl. No.: 10/760,915

(22) Filed: Jan. 20, 2004

(65) Prior Publication Data

US 2004/0144338 A1    Jul. 29, 2004

Related U.S. Application Data

(60) Provisional application No. 60/441,088, filed on Jan. 21, 2003.

(51) Int. Cl.
| | |
|---|---|
| *F02B 47/06* | (2006.01) |
| *F02B 43/12* | (2006.01) |
| *F02M 25/06* | (2006.01) |
| *F02D 23/00* | (2006.01) |
| *F02C 7/22* | (2006.01) |

(52) U.S. Cl. .................. 123/1 A; 123/3; 123/585; 60/279; 60/776; 60/601

(58) Field of Classification Search ............. 123/1 R, 123/1 A, 25 R, 25 A, 25 C, 26, 585, 518, 123/520, 568.11, 568, 568.15, 568.12, 3, 123/DIG. 12; 60/278, 279, 599, 601, 602; 431/4, 8, 12

See application file for complete search history.

(56) References Cited

U.S. PATENT DOCUMENTS

| | | | |
|---|---|---|---|
| 3,800,761 A | | 4/1974 | Sata |
| 3,982,878 A | | 9/1976 | Yamane et al. |
| 4,589,377 A | * | 5/1986 | Van Dal ............... 123/25 R |
| 4,674,463 A | | 6/1987 | Duckwork et al. |
| 5,016,599 A | * | 5/1991 | Jubb ..................... 60/278 |
| 5,239,858 A | * | 8/1993 | Rogers et al. ............. 123/518 |

(Continued)

FOREIGN PATENT DOCUMENTS

| | | |
|---|---|---|
| DE | 3710611 A1 | 10/1988 |
| EP | 0 640 794 A2 | 3/1995 |

*Primary Examiner*—Willis R. Wolfe, Jr.
(74) *Attorney, Agent, or Firm*—Patterson & Sheridan, LLP

(57) ABSTRACT

A power generator provides power with minimal $CO_2$, $NO_x$, $CO$, $CH_4$, and particulate emissions and substantially greater efficiency as compared to traditional power generation techniques. Specifically nitrogen is removed from the combustion cycle, either being replaced by a noble gas as a working gas in a combustion engine. The noble gas is supplemented with oxygen and fuel, to provide a combustion environment substantially free of nitrogen or alternatively working in 100% oxygen-fuel combustion environments. Upon combustion, Very little to no nitrogen is present, and thus there is little production of $NO_x$ compounds. Additionally, the exhaust constituents are used in the production of power through work exerted upon expansion of the exhaust products, and the exhaust products are separated into their constituents of noble gas, water and carbon dioxide. The carbon dioxide may be used in conjunction with a biomass to accelerate the biomass growth and to recover the oxygen enriched air resulting from algae photosynthesis for enhancing the operation of the power generator using the as Biomass for processing into methanol/ethanol and biological oils as fuel for the power generator. The biomass fuel is seen as a solar fuel and may be used in conjunctions with other solar fuels like heated thermal oil and others, as well as clean fossil fuels to optimize to clean, and efficient operation of the power generator in various regulatory contexts.

11 Claims, 8 Drawing Sheets

U.S. PATENT DOCUMENTS 5,674,064 A * 10/1997 Francis, Jr. .................... 431/4
5,958,761 A    9/1999 Yogev et al.
6,477,841 B1   11/2002 Yantovsky

* cited by examiner

FIG. 8

Comparative Efficiency Table

| Changes Which Justify Competitive or Superior Performance of the E² Engines Versus Combine Gas Turbine | E² Engine (Natural Gas) Method 2 | Combined Cycle Gas/Stream Turbine |
|---|---|---|
| Assumed Starting Efficiency (advanced designs) | 49% | 42% |
| Electro-hydraulic Fuel Injector System. Higher injection pressure (200-250 Mpa) for diesel cycle, staged combustion. Faster and more complete combustion causes a significant reduction in particulates and HC, smoother engine ops. resulting in higher reliability and durability. | 3% | |
| Unique combustion cycle. Oxygen Enriched Combustion with Argon substituted for Nitrogen. 35% O₂ and 65% Ar. The exhaust gases are cooled through the expansion cycle to near ambient temperature precipitating out water, scrubbing CO₂ before recycling the fuel gases Ar back into the combustion cycle | 6% | Example Assumes Conventional Burner and Heat Recovery Technology |
| 1) Combustion temp. increased from 1800° C to 2500° C (assuming 60% of theoretical maximum improvement) (exit gases are assumed to be approximately 800° C) 2) Substituting a monatomic gas (Ar) for N₂ (may realize higher gain) | 6% | |
| Fuller heat utilization system for the E² Engine and steam injection. Steam bottoming cycle for the gas turbine cycle | 12% | 20% |
| NOₓ and other emission management | | 2% |
| Parasitic Losses to Produce O₂. Separate Argon to re-circulate back to the combustion, separate water, and CO₂ (may be as low as 15%) | (18%) | |
| Transmission and distrubition losses (can be reduced to close to zero for direct supply to end users) | (1%) | (5%) |
| Potential Efficiency From Production to User | 57% | 55% |

LOW EMISSION ENERGY SOURCE

CROSS-REFERENCE TO RELATED APPLICATIONS

This application claims benefit of U.S. provisional patent application Ser. No. 60/441,088, filed Jan. 21, 2003 which is herein incorporated by reference.

BACKGROUND OF THE INVENTION

1. Field of the Invention

Embodiments of the present invention generally relate to power generation, more particularly power generation incorporating combustion, such as internal combustion engines, including power generation wherein it is desirable to reduce the emission of oxides of nitrogen, hydrocarbons, carbon dioxide and particulates. More particularly still, embodiments of the invention include power generation using a power source having a regeneration mechanism, whereby emissions from combustion are recovered for reuse as a source of fuel for the power source. Additionally, the power generation methods and apparatus herein may be used to provide solar generation capability.

2. Description of the Related Art

Power generation employing internal combustion engines is traditionally accomplished by introducing fuel typically a hydro-carbon based fossil fuel or distilled hydrocarbon fuel) and air into a combustion chamber or volume, and igniting or exploding the fuel, in the presence of oxygen supplied in the air, to cause expansion or increased pressure in the chamber, thereby causing relative movement of a combustion chamber component. The movement of the combustion chamber component is employed to cause a consequent output from the engine, typically in the form of torque and rotation of a shaft extending therefrom. For example, in a piston type of engine the increased pressure caused by the combustion of the fuel-air mixture causes movement of a piston in piston housing, and the piston is connected, through an arm, to a rotatable crankshaft. Likewise, in a gas turbine style of engine, the fuel-air mixture is combusted in a combustion chamber, and the expanding gaseous result passes through a plurality of rotationally mounted finned rotors, causing them to rotate with torque. The result is rotation of a shaft, such as a shaft upon which these the rotors are mounted, the shaft being coupled to a generator, a vehicle or the like, to power the generator or vehicle.

In such internal combustion engines, the efficiency of the engine, as measured by power output on the shaft as compared to the potential power provided by the fuel, is on the order of 30% to 60%. The difference between actual energy recovered and potential energy available, i.e., the 70% to 40% loss in efficiency, is a result of several factors, including inadequate or incomplete combustion of the fuel, generation of wasted heat, frictional losses in the mechanisms used to transform the chemical energy released in combustion to physical energy in the output shaft, exhausting of the combusted mixture before complete recovery of the energy thereof, etc. Each of these factors adds to yield a relatively inefficient internal combustion engine.

One mechanism that has been used in the past to increase the efficiency of the fuel use has been to use the heat remaining in the exhaust to either generate heat for building heating purposes, or to generate further power through a steam turbine, or the like. For example, the temperature of the exhaust of a gas turbine is sufficient to heat and often to superheat steam, which may then be passed through a steam turbine for energy generation therefrom. Thus, the energy recovered in the output of the steam turbine is added to that recovered by the gas turbine as a measure of efficiency. However, gas turbines as a primary engine and without a method of secondary heat recovery are less efficient than diesel cycle engines, which are currently, on a stand alone basis (i.e., no secondary heat recovery based power generation) the most efficient engines commercially available. Further, engines operating on the Stirling cycle would theoretically be more efficient, but have never gained commercial acceptance. The relatively efficient diesel engine using commercial fuels has an exhaust temperature insufficient for efficient steam turbine power generation therewith, whereas the gas turbine has high enough combustion temperature, and exhaust temperature, to allow sufficient heat recovery for commercial uses. The gas turbine with such a heat recovery system is currently the most efficient commercially available system for combustion based electricity production.

Several methods have been used or proposed to increase the efficiency of the internal combustion engine itself. One such methodology includes modifying the air used for combustion by enhancing the oxygen percentage thereof. As a result, a greater percentage of oxygen is available in a given volume of air-fuel mixture (as oxygen displaces Nitrogen in the air), resulting in the ability to have a greater quantity of oxygen and fuel in the mixture per unit volume, and a resulting higher combustion temperature. As is known that if the temperature of the combustion reaction is increased the resulting efficiency of the engine should increase, various schemes have been proposed in the past to provide such an increase in both temperature and efficiency. For example, it is known to combine or mix additional oxygen with the air intake of an internal combustion engine, with a resultant substantial increase in energy recovery efficiency. Further, emissions of carbon monoxide, hydrocarbons and particulates were substantially decreased. As naturally occurring air has an oxygen content of about 21%, the added oxygen both raises the combustion temperature and increases the total quantity of fuel combustible in a combustion chamber of a given size. For example, adding sufficient oxygen to air so that the resulting mixture is 35% oxygen, and employing a diesel cycle engine and diesel fuel, has been demonstrated to result in significant increase in power output for an engine, as the greater concentration of oxygen allows greater quantity of fuel to be introduced and combusted. However, the engine also released, as exhaust, unacceptably rich emissions of greenhouse gasses as nitrogen oxides, approximately double that of a non-oxygen enriched diesel cycle engine, and also was unable to be effectively controlled. Although the amount of Nitrogen in the oxygen enriched air is less (because, on a volume to volume comparison, some is replaced by oxygen) and thus one would expect fewer $NO_x$ emissions, the increased temperature caused a higher reaction rate or reactivity between nitrogen and oxygen, resulting in a greater efficiency and power output, a lower emission of particulates, CO and other compounds, the production rate of $NO_x$ compounds also was significantly increased. As a result, this concept has not been further pursued.

An ongoing issue with the use of fossil fuels or other hydrocarbons in conjunction with internal combustion engines is the generation of pollutants, such as $NO_x$ or $CO_x$ compounds. A portion of these emissions, specifically the $NO_x$ compounds, are known to cause disruption of the ozone layer, and/or smog, as well as being generally unhealthy when inhaled. CO is toxic, as is an additional emission gas, $CH_x$. Likewise, $CO_2$ has been implicated in global warming, and the emission of it may become limited in the future. Thus, although the efficiency of the engine can be increased, the resulting pollution is unacceptable.

An additional method of power generation is solar power, such as a solar energy generating station or "SEGS," in which solar energy is converted to electricity. As solar energy is unavailable during the night, such SEGS plants are typically used to generate "peak" and mid peak power, i.e., they are used during periods of the day when the sun is shining when electricity demand is highest. These peak times are locale dependant, such as, for example, locations of high solar insulation where the need for electricity to power air conditioning units is much higher in summer months. Alternatively, or additionally, such peaks can occur as electrical consumers return to their homes in the late afternoon or early evening hours, and begin using air conditioners, appliances and the like. To provide the peak power needed, utilities are often willing to pay an a higher charge to the power generator, including SEGS, for this power during peak hours. Further, these peak plants are often operated only during peak demand periods, and thus their cost, i.e., the investment in infrastructure, is not recoverable based upon continuous generation, but rather based on less that full utilization.

Although SEGS have proven to be capable of providing power during peak operation times, there are limits of competitiveness which affect their use for base line power generation needs. As the plants cannot operate in non-daylight hours, the cost of building the solar power generation equipment must be justified based solely upon generation during these daylight hours. Thus, the electricity generated must be capable of being sold at a premium over electricity generated at power stations where the power generation is continuous, i.e., base line plants which operate continuously, 24 hours a day, except when down for maintenance or unusual lack of electricity demand. In localities that have significant disparities between base load and peak load, it is not uncommon for peak load to be 2 to 6 times larger than base load requirements. In these localities with big disparities between base load and peak demands it is important to encourage building peaking plants that do not run many hours and this incentive is usually provided by providing substantially higher prices or values on peak pricing. Even with substantially higher priced peaking power it is usually the case that economic analysis will determine that it is most beneficial to the energy supplier to meet these requirements with the lowest cost, typically less efficient and more environmentally unfriendly systems than solar. In order to encourage clean energy sources to supply this peak power, incentives are sometimes offered. The incentives often give clean a energy supplier delivery preferences either by accepting clean energy on a first priority basis against other suppliers if they are priced equally, or to allocate some percentage of peak or as delivered energy to be supplied from clean energy sources. As well as the delivery preference a tax environment of specific SEGS benefits are often provided to make of an even tax playing field between SEGS suppliers and fossil fuel plant providers. As a potential supplier of clean energy, SEGS plants, which are based on the delivery of solar thermal sources of energy, are in an unusual position. On one hand they are able to deliver clean energy from solar and they are also able to produce energy by using fossil fuels to power a steam turbine otherwise normally powered from solar energy. Were the SEGS to receive preferences associated with its clean solar delivery it is usual practice to limit the amount of fossil fuel energy the SEGS plant is entitled to produce relative to the solar energy that it produces and requires the plant to produce 100% of its output capacity from solar energy alone.

Solar energy plants which often deliver energy during peak demand hours typically provide that energy as a direct consequence of the amount and intensity of the solar incident light that falls on the solar field, with the solar field being comprised of photovoltaic fields or solar thermal fields. However solar thermal fields have an added flexibility. Solar thermal plants typically operate by raising the temperature of some intermediate fluid to high temperature and then circulate that intermediate fluid through a heat exchanger that boils water, and resultant steam is used to run a steam turbine to make electricity. However it is technically quite easy for the solar thermal steam to be provided by fossil fuel and not just from solar source. Thus when the sun is not shining, the power block portion of the solar thermal plant is able to operate by using fossil fuel to directly heat the water in a parallel boiler, creating steam to run the turbine. This added flexibility allows solar thermal plants to be available to supply energy when the sun is available and when the sun is not available. However, because of the limitations on the use of fossil fuels and the requirement that the plant must be able to produce 100% of its rated output from solar alone to receive preferential supply status and certain tax and other benefits of being considered solar, the fossil fuel based generation is minimally used and suboptimum power generation equipment is used. For example, although it may be reasonable to combine gas turbine and solar generation, the cost effective solar plants available before this new technology are not able to produce for technical reasons the full rated power of the plant from solar alone. Thus a current SEGS plant cannot operate highly efficient combined gas-steam cycle turbines and still be considered a solar plant in many if not all locales. Most solar energy equipment at most can heat an intermediary fluid converted to steam and drive a turbine to temperatures of about 400° C. Whereas, in order to run a highly efficient combined gas-steam turbine, where the waste heat exiting the gas turbine is fed into the steam turbine, the initial temperature of the compressed air entering the gas turbine must be heated to 2000° C. 1600° C. needed to bridge this gap results in commercial solar fields running the most efficient steam turbines at approximately 40% efficiency instead of the most efficient combined cycle plant running a 60% efficiency. There does exist one type of solar collector technology called a power tower, which focuses a large number of mirrors, each one independently shining the sunlight onto a small location at the top of a very tall tower. That location at the top of the tower becomes very hot, in excess of 2000° C. The goal of this design was to be able to obtain temperatures that would be able to run efficient combined gas-steam turbine systems. However for many reasons most of which can ultimately be related to lack of sufficient material technology at this stage this approach is too expensive, inefficient and unreliable to be developed in to a commercial product. Further improvements at the material science level that may take many years to develop must still made.

Therefore, their exists a need in the art for a power source, particularly one using a combustion based engine, wherein the resulting efficiency is increased without the production of, or with a significant reduction in the production of, byproducts such as $NO_x$ and CO and particulates in the resulting emission stream, and with greater efficiency than prior art devices. Likewise, there is a need to provide solar based generating capacity (SEGS) having more widespread use, significant increases in efficiency, and significant increases in valuable on-peak delivery of energy and power compared the amount of energy and power delivered off peak. All the above being achieved within frameworks that are consistent with restricted fossil fuel use.

SUMMARY OF THE INVENTION

The present invention generally provides a higher efficiency, lower emission, power generator, by virtue of operation of an internal combustion engine in the absence of, or with a relatively restricted amount of, air or materials in the air which contribute to NOX formation. In one aspect, the power generator is an engine is operated by introducing a combination of a fuel, a gas for combustion with the fuel and a noble gas into the combustion chamber of an engine, and combusting the fuel and gas therein. In one aspect, the noble gas is argon. In another aspect, the gas for combustion is oxygen.

In another aspect, the power generator is coupled to a gas and heat recovery system, in which the exhaust resulting from combustion is recovered and the heat is used to generate power. In one aspect, this includes providing a separator to separate the noble gas from the exhaust and reusing the noble gas for further use in the power generator. In another aspect, this includes providing a reaction mechanism for reacting the non-noble gas components with an expansion medium to separate the individual components of the remaining exhaust stream. In a further aspect, this includes providing a separator to separate $CO_2$ components, of the exhaust stream and a biomass for the recovery of oxygen therefrom. In a still further aspect, a reinsertion system is provided to direct the oxygen back into the power generator.

In another aspect, a method of generating power includes providing a mixture of noble gas and combustion gas to a combustion location, providing a quantity of fuel to the combustion location and initiating combustion, and converting at least a portion of the generated energy into a physically useable form. In one aspect, the generation is provided in an internal combustion engine, and the power is removed from the power generator by virtue of a rotating shaft.

In another aspect, the method includes recovering the gas stream resulting from combustion, such that the noble gas is separated from the gas stream and reused in the power generator as a carrier gas for further combustion. In another aspect, this includes combining the non-noble gas constituents with a reaction medium to convert these gasses to their constituent elements. In a further aspect, this includes separating components of the exhaust stream having combustible gasses therewith, and directing them to a biomass for the recovery of combustible gasses therefrom. In a still further aspect, the combustible gasses recovered from the biomass are reinvested into the power generator. In a still further aspect, the combustible gasses include oxygen. In a still further aspect, the reaction medium is superheated steam or water.

In additional aspects, the power generator may be combined with additional resources for exploitation thereof. For example, the generator may be used as the engine for a vehicle, such as a road vehicle, a railroad vehicle, a ship's power plant and the like. Likewise, the power generator may be combined with other power generation schemes for greater utility. In a still further aspect, the exhaust of the power generator may, either before or after separation, or in a partially separated composition, be used to heat water or another liquid for use in generating a steam turbine or for otherwise producing heat for commercial and/or residential uses, such as heating.

In another aspect, the power generator may be combined, with a solar generating capacity, to provide a substantially increased generating capacity. In this aspect, a power generator includes an internal combustion engine. A burner is supplied, upstream from the gas turbine, in which oxygen and fuel are combined and combusted. This high pressure high temperature stream of the products of combustion is then passed through the turbine to generate power at the output shaft thereof. To provide oxygen for combustion with the fuel, air is passed through a chiller and the oxygen separated therefrom is passed on the burner. Additionally, to reduce the occurrence of greenhouse gasses, the natural gas is passed through a chiller, causing the nitrogen therein to precipitate therefrom before the introduction of the gas to the burner. The exhaust stream, after passing through the turbine, is used in a secondary recovery system, to further extract energy therefrom and cool, the exhaust stream. In one aspect the exhaust stream is separated into its individual components, and the components are further used. In an additional aspect, this includes passing the $CO_2$ in the exhaust stream to a biomass, and converting the carbon dioxide and biomass into additional biomass and oxygen for reuse in the burner. In another aspect, the solar component of the power generator is the growth of the biomass and the recovery of fuel and oxygen therefrom

BRIEF DESCRIPTION OF THE DRAWINGS

FIG. 8 is a table comparing the efficiency of the power generator of the present invention with that of a conventional application;

DETAILED DESCRIPTION OF THE PREFERRED EMBODIMENT

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
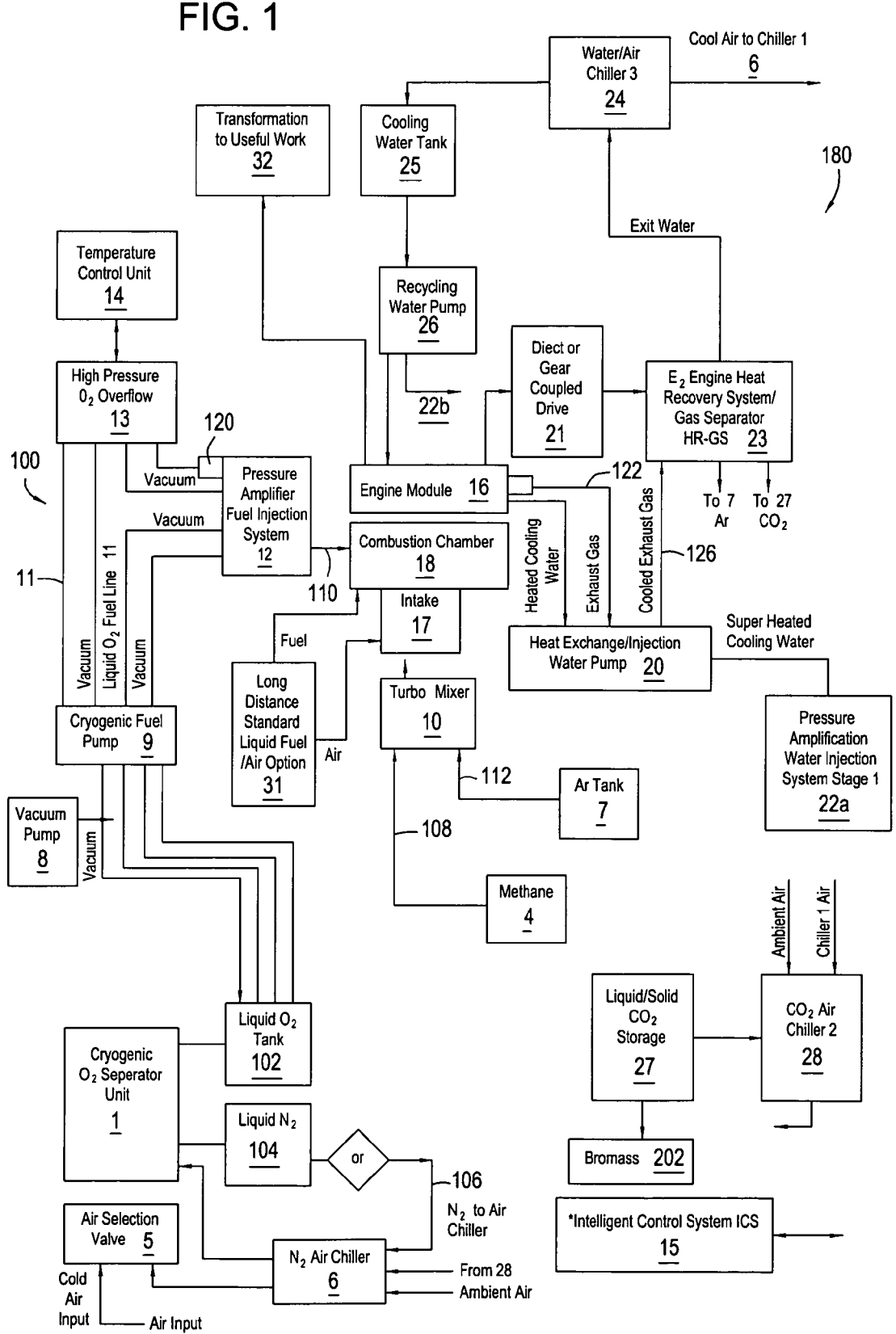
FIG. 1 is a schematic view of an embodiment of the power generator of the present invention.

FIG. 1 is a schematic representation of an embodiment of the power generator of the present invention, showing the individual components and their interconnection useful for generating power with minimal emission and a relatively high efficiency. Essentially, in this embodiment, the major components of the invention include an internal combustion engine 16, such as a diesel cycle engine, an engine heat recovery and gas separator system 23 for the separation of the various components of the exhaust or emissions of the engine, an input unit 100, from which fuel and gasses useful in the combustion of the fuel are stored or generated and then introduced to the engine, and a separator portion 180, from which the separated exhaust or emission components are recovered for further use. In steady state operation of the power generator of this embodiment, the air is brought into the input unit 100 and the oxygen is separated therefrom for introduction into the engine through an injector, while a working gas, in this embodiment a noble gas such as argon is combined with fuel and introduced through the engine manifold to reach the combustion chamber 18 of the engine 16 and combine therein with oxygen to create a fuel oxygen mixture to be combusted. The oxygen and fuel combust to form $H_2O$ and $CO_2$, which along with the noble gas, are exhausted to the engine heat recovery and separator system 23, and thence to separator system 180, where the three main components thereof are separated from one another. (It will be understood by those skilled in the art that a small portion of CO will likely be produced, but these trace amounts are minimal). The $CO_2$ recovered from the exhaust stream is directed into an oxygen recovery portion 190, in this embodiment a biomass composed as an algae bed, where photosynthesis converts the $CO_2$ and water into additional plant material and oxygen, or the $CO_2$ is stored for reuse or sale. The oxygen is recovered for reinsertion into the engine 16. Likewise, the $H_2O$ may be separated cryogenically, such that the oxygen therein may be reinvested into the engine, and the hydrogen recovered for other uses, including as a fuel for the engine. Additionally, in this embodiment, the power generator includes the ability to operate in a non-recycling mode, where supplies of oxygen are not readily available or generatable onboard. Thus, there is provided a power generation system in which power may be generated from carbon based fuels using traditional engine technologies, with minimal or zero emissions of $NO_x$ and CO compounds.

Referring still to FIG. 1, these features are provided by providing an engine 16, in this embodiment an engine operable on the diesel cycle, i.e., in which the combustion of the fuel-oxygen mixture is compression triggered. To provide the fuel-oxygen mixture, input unit 100, in this embodiment, includes cryogenic separation unit 1, which is selectively communicable with both the ambient condition, typically atmospheric air, as well as a supply of air dischargeable from air chiller 6, through an air selection valve 5. Air, upon entering the cryogenic separation unit 1, is reduced in temperature to at or below the temperature at which the constituents therein separate by phase, and thus many constituents of the air may be separated therefrom. In particular, the cryogenic separation unit 1 is configured to separate oxygen from the air for storage in a liquid oxygen tank 102, argon for storage in an argon storage tank 7, and nitrogen for storage in a nitrogen storage tank 104. In this embodiment, the nitrogen in nitrogen storage tank is ported, via nitrogen line 106, to the air chiller 6, to pre-cool the air entering the cryogenic separation unit 1. The nitrogen may also be collected for sale or other uses. Thus input unit 100 provides, from ambient air, both argon for use as a working gas for the power generator as well as oxygen for use in combustion of the fuel to be introduced.

Referring still to FIG. 1, input unit 100 further provides the fuel and mixes such fuel for introduction to the engine 16. Specifically, in this embodiment, a carbon based fuel such as methane is mixed with argon for injection through the injector 110 of the engine 16, where it is combined and combusted with oxygen likewise introduced therein. In this embodiment, the fuel is stored in fuel tank 4, and is ported, through fuel line 108, to turbo mixer 10 (which may take the form of a turbocharger) where it combines with argon supplied to the turbo mixer through argon line 112 extending from argon storage tank 7. Once mixed in the turbo mixer 16, the argon-fuel mixture is introduced to the intake manifold 17 of the engine 16. The mixture then travels though the intake manifold 17 to a combustion chamber 18 of the engine, it being appreciated that the engine 16 includes multiple such combustion chambers, each bounded by a chamber wall and a piston, the piston attached to a crank shaft such that upon combustion the piston moves outwardly of the combustion chamber and transmits power to the crankshaft and after exhausting the combustion products, fresh fuel, working gas and oxygen is introduced and the crankshaft pushes the piston inwardly of the combustion chamber to compress the mixture therein to the combustion pressure. The crankshaft may form, or is coupled to, the engine out put shaft (not shown).

As the fuel-argon mixture is ported into the intake manifold 17 of the engine 16, the oxygen is ported to the combustion chamber 18. This is accomplished, in this embodiment, by providing a cryogenic pump 9 and imposing a modest pressure to push the oxygen along a thermally insulated oxygen line 11 to a pressure amplification fuel injection system 12, such as a HEIU system available from Caterpillar industries or a MEFIS system available from Mazrek. The injectors of this system preferably include nozzle heads with hardened components or surfaces, to increase wear resistance in the hostile combustion chamber 18 environment. By using this configuration, the oxygen may be cryogenically pumped to the engine 16 with minimal parasitic losses, yet may be pressurized to enable injection into the combustion chamber 18 when it reaches the combustion chamber 18. To regulate the temperature and pressure in the oxygen line 11, the line 11 is ported to a intermediate high pressure overflow chamber 13, as well as a temperature control unit 14 which may heat or cool the line 11, as needed, to maintain the proper temperature (approximately −170C.) and pressure in the line 11. Dampeners 120 are provided in the line 11 immediately before the terminus thereof at the amplification fuel injection system 12 to minimize resonance on the line 11. Such a dampener can be a pressure regulator, such as a spring loaded piston or a membrane which enables change in the volume of the line immediately before the amplification fuel injector system 12, or simply an additional pipe dead headed from line 11 immediately before the amplification fuel injector system 12.

The amplification fuel injection system 12 provides pressure amplification of the oxygen, and injection thereof in a liquid state, to the combustion chamber. The actual amplification level is set to optimize the combustion cycle and the overall efficiency of the power generation system. Where the engine 16 is a diesel cycle engine, the amplification is on the order of 10 to 20 to one or greater, thereby injecting at a pressure on the order of 200 to 250 MPa and minimizing the Cryogenic pump 9 pressure requirements and is in the range of current cryogenic pump capability. For example, pumps such as the PD series of cryogenic pumps, available from Chart Industries, Inc., would operate acceptably. Where a spark based combustion engine is employed as engine 16, the pressure amplification and cryogenic pump pressures may be lower, as the pressure in the combustion chamber 18 into which the oxygen must be injected is lower. Referring still to FIG. 1, after the oxygen and fuel-argon mixture are received in the combustion chamber 18, compressed by the piston and ignited, the combustion products are exhausted therefrom conventionally through an exhaust manifold 122 and ultimately to the separator system 180, which is, in this embodiment, configured in three stages: A first stage to reduce the heat of the exhaust gasses and capture that heat in a different media for further use, a second stage to further cool the exhaust stream and recover useful work or power therefrom and reduce the temperature thereof to the point where separation of the component is possible, and a third stage wherein the exhaust stream components are separated out. Thus, in the first stage of the separator system 180, these combustion products, which exit the engine 16 at a temperature on the order of 800C. are then ported through an exhaust line 124 to pass through one side of the heat exchanger of the heat injector/injection water pump 20 which provides the first stage of transferring a significant percentage of the heat to the cooling water in which is a superior form from which to convert engine heat into a form from which it is more easily possible to recover from the heat useful down stream work and thereafter cooling of the gases through volumetric expansion. These exhaust gasses exchange heat and thereby superheat highly pressurized water flowing through the other side of the heat exchanger. In this embodiment, the water entering the heat injector/injection water pump 20 is that which has just exited from the engine's cooling system 16. In the heat exchange process the engine's exhaust gases heat up the engine exit cooling water to on the order of 400C. Once cooled in the heat injector/injection water pump, the exhaust gasses are ported through secondary intake line 126 to the second stage 130 of the separator system 180.

Figure 6:
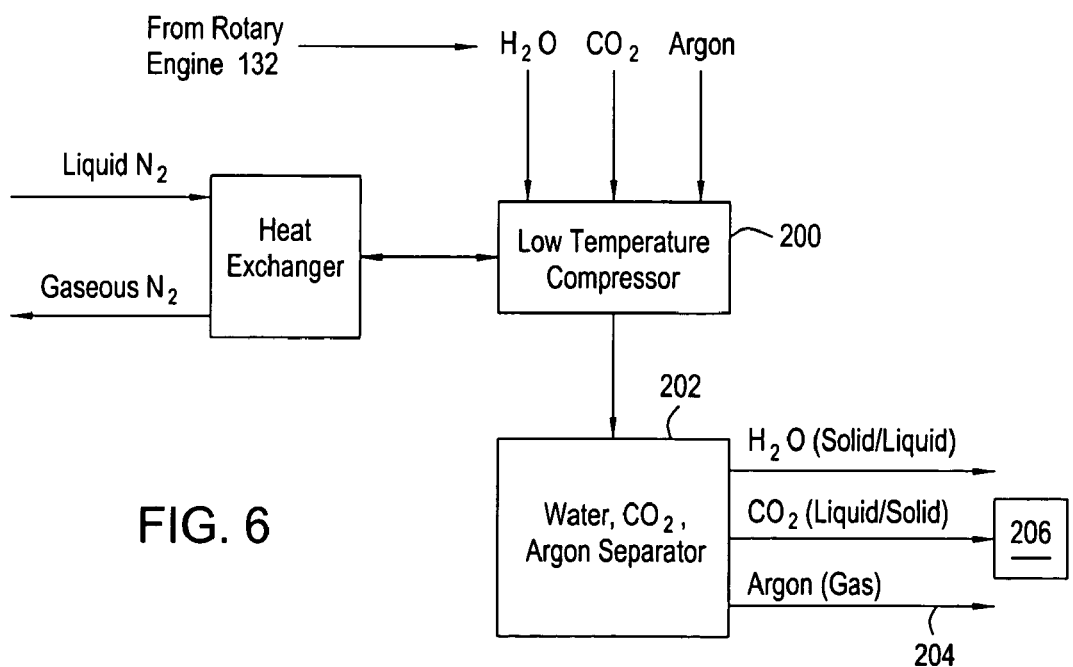
FIG. 6 is a schematic view of a portion of the heat transfer and gas separation portion of the power generator of FIG. 1.

The second stage of the separator system 180 provides first heat recovery as the heated gas and the superheat highly pressurized water is injected into the heat recovery unit in a manner describe below. Subsequent to the heat recovery stage, within the chamber the expansion increases the temperature of the gas which will drop significantly preparing the components of the gas for separation of the exhaust stream components, in this embodiment primarily $H_2O$, $CO_x$ and argon. Additionally, the $CO_x$ will, with proper operation of the engine 16 and variations of fuel, oxygen and argon, be primarily composed of $CO_2$ with only trace amounts of CO. Thus, in this second stage, in the engine heat recovery and gas separator 23 the exhaust gasses are further reduced in temperature to a temperature on the order of −50° C. In the third stage the cooled gasses are pressurized and at the same time cooled by liquid nitrogen (See FIG. 6), at which point the $H_2O$ will precipitate out of the stream as supercooled water and ice, the $CO_2$, will precipitate out as a liquid, and the argon will remain in a gaseous state. To enable this feature, in this embodiment, two rotary engines are coupled in series, i.e., the exhaust of one is used as the feedstock for the second, to cool the exhaust in two stages by expansion while converting stored energy in the heated exhaust into work or power output of the shafts of the rotary engines.

Figure 2:
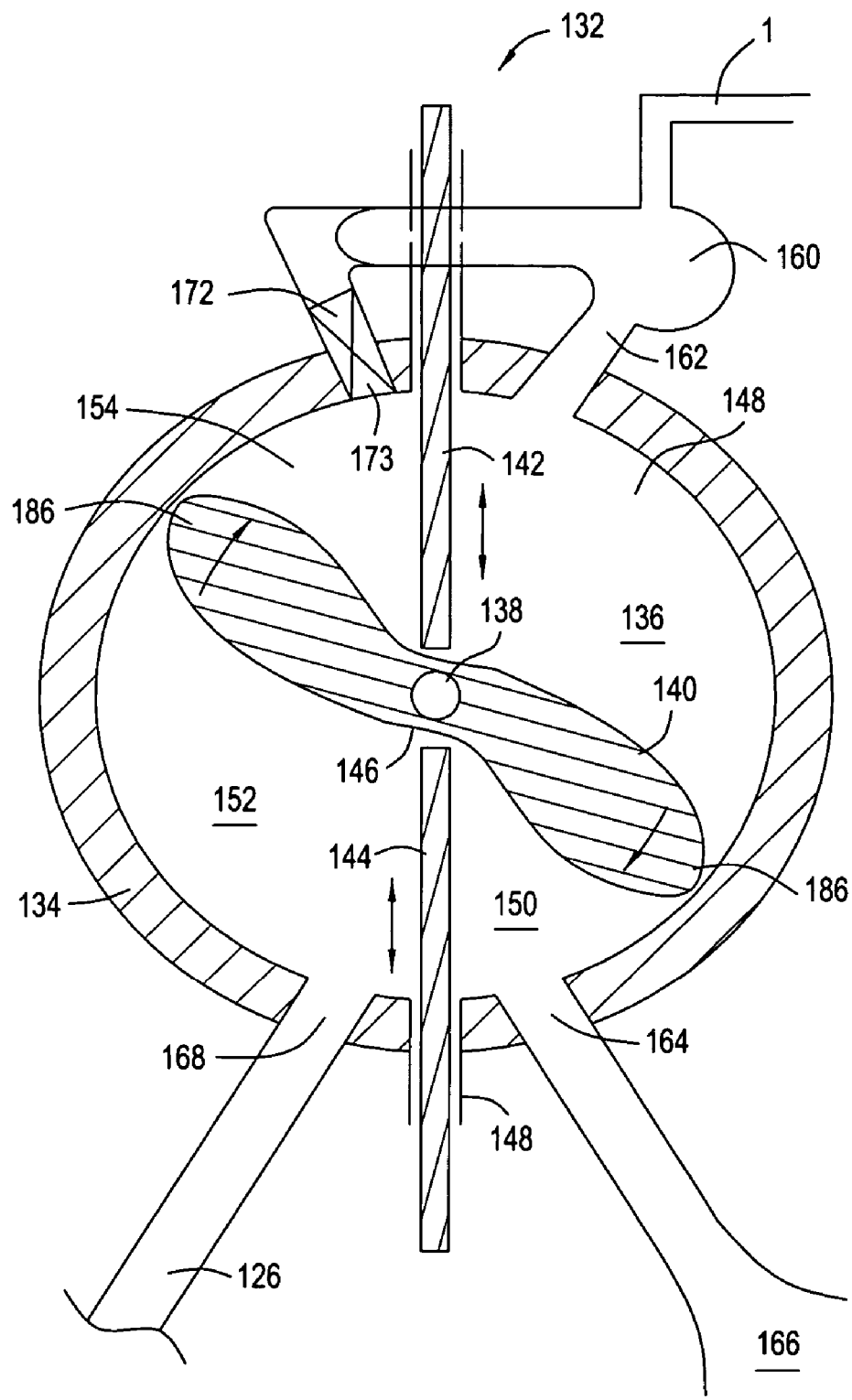
FIG. 2 is a sectional view of a rotary engine component useful in the power generator of FIG. 1.

Referring now to FIG. 2, an embodiment of the first rotary engine 132 of the second stage of the separation system 180 is shown in section. This rotary engine 132 configuration includes a generally cylindrical housing 134 having opposed, generally circular ends 136 (only one shown), in which is mounted on a shaft 138 a generally propeller shaped rotor 140 and a pair of opposed abutments 142, 144, the function of which is to, in conjunction with the surfaces of the rotor 140, form four compartments of variable size within the cylindrical housing 134.

The operation of the abutments 142, 144 with the rotor 140 is described with respect to the lower abutment 144, as follows. The lower abutment 144 includes an interior end 146 which is maintained in very close position adjacent to the surface of the rotor 140, such as several microns of space therebetween, and a second end which is extendable through an abutment sleeve 147 extending through the cylindrical housing 134. As the rotor 140 rotates about the shaft 138, the abutment 144 is linearly moved inwardly and outwardly of the volume in the cylindrical housing 134, always maintaining a very close spacing between the interior end 146 of the abutment 144 and the face of the rotor 140. Thus, as shown in FIG. 2, the interior volume of the cylindrical housing is separable into four portions: An expansion chamber 148, an exhaust gas chamber 150, a low pressure intake chamber 152 and a gas compression chamber 154. Additionally, each of the volumes comprising these chambers 148–154 is communicable with an entry or exit port extending through the wall of cylindrical housing 134. Specifically, expansion chamber 148 is communicable with a combustion chamber 160 through a combustion chamber port 162, an exhaust port 164 extends from the exhaust chamber 150 to an exhaust manifold 166, an intake port 168 extends from a supply of engine exhaust to the inlet chamber 152, into which the fluids and/or gasses may be introduced to the engine 130, and a compressed gas inlet 172 is provided to selectively port the gasses compressed in the compression chamber to the combustion chamber 160 to thereby introduce the compressed fluids and gasses into the combustion chamber 160.

Figure 3:
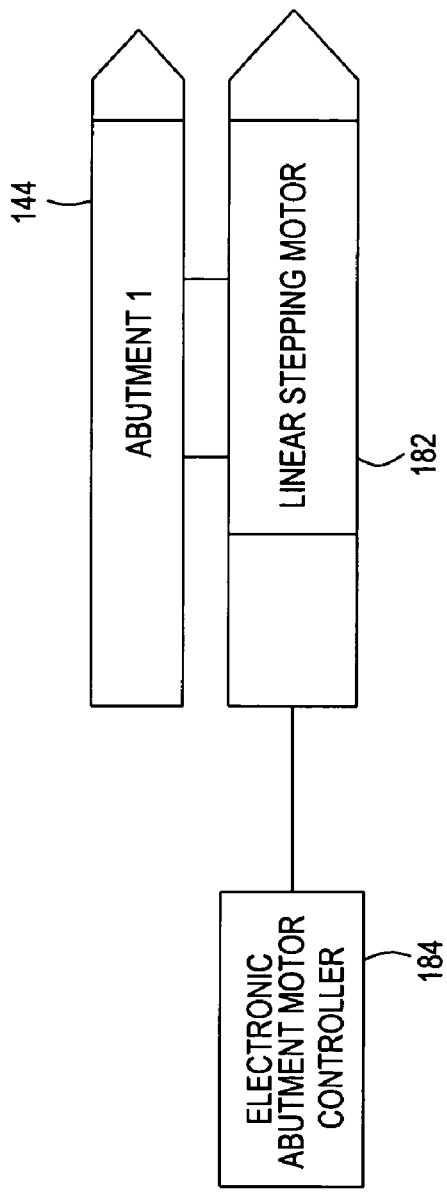
FIG. 3 is a schematic of a control system used in conjunction with the components of the rotary engine of FIG. 2.

To move the abutments 142, 144 inwardly and outwardly, abutment controls 180 (184) are provided. Each abutment control, as shown schematically in FIG. 3, includes a linear stepping motor 182 connected to the abutment 142 (or 144) at a position outwardly of the chamber volume, and the linear stepping motor moves the abutment 142 (or 144) inwardly and outwardly of the chamber volume, such that the interior ends 146 thereof are maintained within microns of the rotor surface. This is accomplished by controlling the stepping motor 182 with a controller 184, into which is programmed the position required for the interior end 182 of the abutments 142, 144 for any rotational position of the rotor 140. The rotational position of the rotor 140 may be determined, and fed to the controller 184, such as with a precision magnetic pickup or series of the same on the shaft 138 calibrated to the rotor position. It should be appreciated that as the rotor 140 turns, the ends or tips 186 of the rotors will pass the abutment interior ends 146, and thus the individual chambers formed within the cylindrical housing 134 will vary from a maximum to zero, or nearly zero, volume.

The rotary engine 130 may be used as an internal combustion engine, for example, by having the fuel/carrier gas mixture enter the intake and having the gas for combustion injected into the combustion chamber, or it may be used as an energy recovery and exhaust cooling system To use the rotary engine as a energy recovery system and exhaust cooling system, the exhaust gasses from engine 16, consisting primarily of $CO_2$, Argon, and $H_2O$ from combustion (but not superheated 350° C. engine exit cooling water) are passed through the heat exchanger and enter the low pressure intake chamber through intake line 126 which is ported to intake port 168, thereby introducing the gasses into the low pressure intake chamber 152. The movement of the rotor reduces the pressure in the input chamber sucking in the exhaust gas from the heat exchanger into the chamber. As rotor 140 rotates about shaft 138, it passes over intake port 168, thereby causing no further exhaust to be taken into the particular volume being drawn into the low pressure intake chamber 152, and causing the volume to now exist in the compression chamber 154. This volume of emission/exhaust is thus compressed, and the exhaust gases $CO_2$, Argon and $H_2O$ as the volume of the compression chamber is reduced as the rotor continues to rotate and as a result the approximately 500° C. intake gases are heated to high temperatures. At an appropriate time a valve 173, which is either electrically controlled or mechanically timed, such as through a cam and arm arrangement connected to the shaft 138, opens to enable the compressed exhaust to pass through the compressed gas inlet 172 and thence into the combustion chamber 160. Simultaneously, the low pressure chamber has reformed as bounded by the abutment 144 and the opposed side of the rotor 140.

In order to use this rotary engine 132 as a energy recovery system and a gas expansion and separation system, a further modification is needed, in order that the volume achievable in the expansion chamber 148 and the exhaust chamber 144 are enlarged in comparison to the volume of compression chamber 154 and low pressure intake chamber 152. With the high temperature gases compressed into the combustion chamber, the 400° C. superheated engine exit cooling water pumped by the pump located in the Heat Exchanger and Water Pump under modest pressure, 10 Mpa (1,470 PSI) is pumped into the Pressure Amplification Water Injection System (22a) with 25 times amplification. The highly energized water, similar in state to water exiting a steam turbine boiler, enters the combustion chamber, but because the water has been injected at such great pressure (250 Mpa, 36,750 PSI) the water enters the chamber as micro size supercharged droplets that essential explode in the high temperature gas environment. This explosive expansion pressurizes the combustion chamber followed by the expansion chamber allow most of the energy to be recovered from the exhaust gas, and even the exist engine cooling water.

Figure 4:
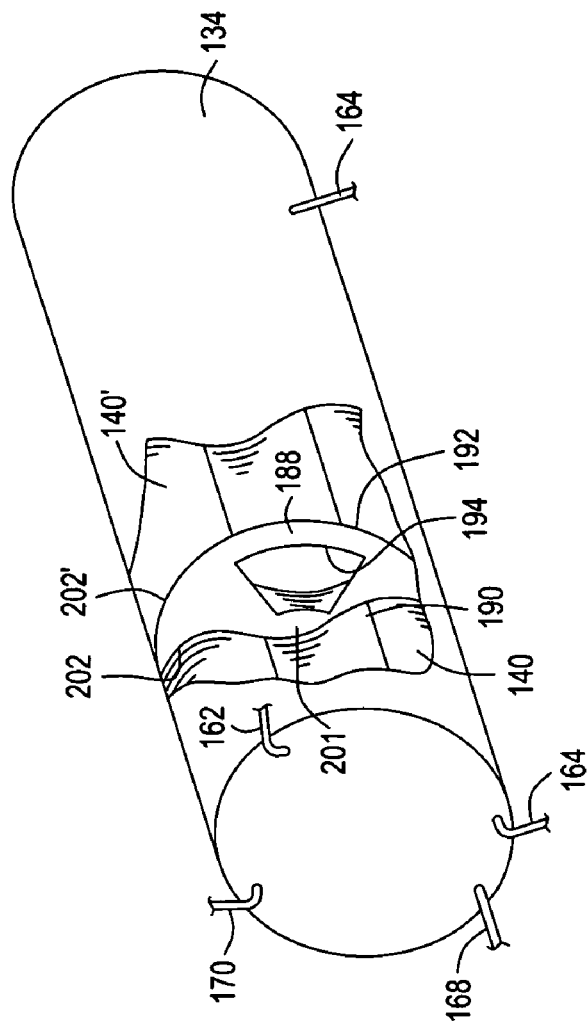
FIG. 4 is a perspective view of the rotary engine of FIG. 1, with certain components removed therefrom for clarity of illustration.

Referring now to FIG. 4, this is accomplished by modifying the rotary engine 132, in this embodiment, by providing a partition 188, generally circular in shape, within the chamber body and parallel to the ends thereof, and providing a rotor of substantially equivalent cross-section commonly on the shaft 138 in each of the two sub chambers 190, 192 formed therein. (Abutments 142, 144 have been removed from this FIG. 4 for clarity, it being understood that such abutments will be present and will operate as described previously herein in conjunction with both rotor 140 in sub chamber 190 and rotor 140' in sub-chamber 192.) Likewise, the combustion chamber 160 is not shown, for clarity of discussion. Thus, rotor 140 is provided in the first sub chamber 190, and rotor 140' is provided in second sub chamber 192. However, in this embodiment, although an intake port 168 and a compressed gas outlet 170 are provided in communication with the low pressure inlet chamber 152 and gas compression chamber 154, respectively, of the first sub-chamber 190, such inlet and outlet are not provided to the low pressure inlet and compression chambers of the second sub-chamber. Likewise, the combustion inlet port 162 is not provided between combustion chamber 160 and the expansion chamber 148' of the second sub-chamber 192, although the exhaust gas chamber 150 of the second sub-chamber 192 is ported via a separate exhaust port 164 to the exhaust manifold 166. Additionally, a bypass cut-out 194 is provided through the partition 188 includes a bypass cut-out extending therethrough, to enable common pressure to be maintained in the expansion chambers 148, 148' and in the exhaust chambers 150, 150", but not as between intake chambers 152, 152' and compression chambers 154, 154'. As a result, the volume of the exhaust initially taken up by the engine 162 is smaller than the volume into which the combination of the exhaust gas and superheated water expand. In this embodiment, this volume difference is on the order of three to one, which is provided by placing the partition 188 one-third of the span of the cylindrical housing 134.

Figure 5:
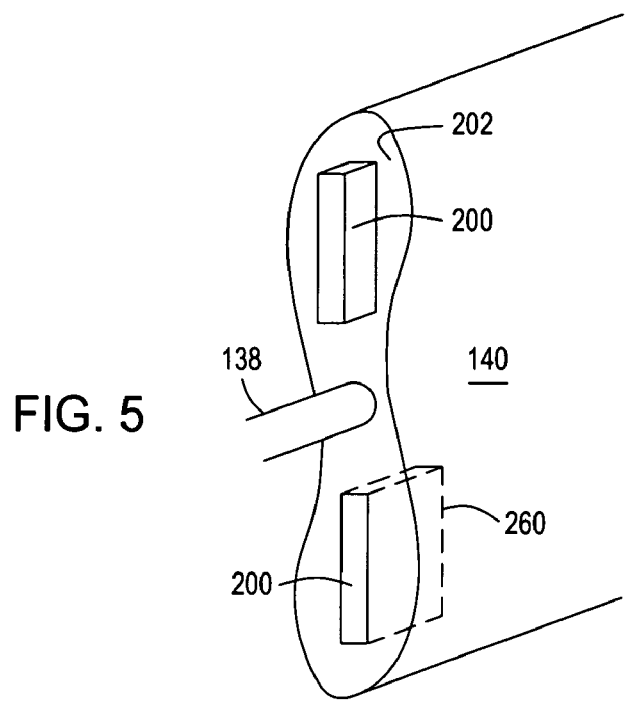
FIG. 5 is a perspective view of the end of a rotor which is a component of the rotary engine of FIGS. 2 and 4.

As the bypass cutout is a three dimensional feature, i.e., it has a perimeter as well as a thickness equal to the thickness of the partition 188, there is the possibility, and in fact likelihood, of leakage between combustion expansion chambers 148, 148' and the exhaust chambers 150, 150', and thus an additional isolation paradigm is needed. To provide isolation, the bypass cutout 194 is configured to enable a secondary seal to be interposed between the rotors 140, 140' when the rotors are simultaneously passing the bypass cutout 194. In this embodiment, as shown in FIG. 5, this isolation is provided by extending, from each arm 196, 198, of rotor 140 a secondary wiper 200, which has a width contoured to the profile of the rotor 140 and a greater than the width of the bypass cutout 194. As shown in FIG. 5, the uppermost wiper 200 is depicted in an extended, in the cutout 194 position, and the lowermost wiper 200 is show retracted into the rotor 140.

As shown in FIG. 4, the perimeter of the bypass cutout 194 is formed at two radii 201, 202 formed at an angle to each other and extended from the center of shaft 138 and of arcs formed at two at two different radii from the shaft. As a result, the wiper 200 is presented with consistently spaced inner and outer radial surfaces as the rotor 140 passes the wiper in the bypass cutout 194. To achieve extension of the wiper 194 from the rotor end face 202 to engage against rotor 140' and face 202', the wiper 200 is bias loaded in a conforming slot 206 in the end face 202 of rotor 140. To extend and retract the wiper 200, a cam and lever (not shown) are preferably linked to the shaft 138, such that the cam is actuated when the shaft is positioned such that rotors 140, 140' have just cleared the cutout 194, and secondarily is actuated when the wiper 200 is about to reach the end of the cutout 194. When the cam indicates the cutout 194 is cleared by the rotors 140, 140', the wiper is extended. When the cam indicates the cutout perimeter is about to be reached by the rotors 140, 140', the wiper 200 is retracted. To extend the wiper 194 a plurality of springs, or a pressure bladder may be employed (not shown). To retract, the cam may cause a rotary cam having a spiral slot therein to engage a pin extending from the wiper, generally parallel to the partition 184, to pull the wiper 200 back into rotor 140. The construction and operation of such cams, arms and retraction devices is well known to those skilled in the art.

Thus, when exhaust gas is introduced to low pressure intake chamber 152, it becomes compressed in compression chamber 154 and enters combustion chamber 160 where it is combined with superheated droplets of water. When the combustion chamber 160 is then vented to the combustion expansion chamber 148, the products of the combination of superheated water and the exhaust stream expands also into combustion expansion chamber 148' by flowing through the cutout 194. Thus, the combined exhaust-superheated water expands, in this embodiment, into three times the volume the exhaust was compressed into, to enable the mixture to be substantially expanded and thereby cooled. Once the rotors have moved to create the maximum volume of the combustion expansion chambers 148, 148', the rotor tips pass over exhaust ports 164, 164', and the separated by phase mixture passes into exhaust manifold 166. Thus, as the rotors 140, 140' rotate, consecutive volumes of exhaust gasses are compressed, mixed with superheated water, expanded, and exhausted into exhaust manifold 166.

In addition to the expansion and consequent phase based separation of the exhaust components afforded by the engine 132, the expansion of the exhaust gasses/superheated water mixture releases energy which is converted to power by virtue of the expanding mixture pushing on the rotors 140, 140' to cause rotation of the shaft 138, and likewise supply energy in excess of that needed to compress the incoming exhaust gasses. Thus, shaft 138 may be coupled to a generator to generate electricity, or may be coupled to other work transfer devices, such as a working shaft to power equipment, motor vehicles, ships, trains and the like.

Although the exhaust gasses have been cooled in rotary engine 132, they are still above the condensation temperature of the $CO_2$. Therefore, the exhaust manifold 166 of the second stage rotary engine 132 is coupled to the inlet of an additional second rotary engine 132', in this embodiment having the configuration of the rotary engine 132 of FIG. 3 and therefore not separately described. In use, the exhaust of the rotary engine 132 is input to the inlet of the second rotary engine 132', and supercooled water is injected into the combustion chamber thereof, such that upon combination the gasses expand and again drive the rotors 140, 140' to turn the shafts and thereby produce energy, while simultaneously expanding the exhaust-water mixture to −50C. Useful work is accomplished to drive the rotors of this second rotary engine 132', such that power can be recovered from the shaft 138' thereof.

Once the exhaust has exited the second rotary engine 132', it enters the third stage of the separation system 180, in this embodiment a low temperature compressor, which compresses the exhaust stream from the second rotary engine 132', and thereby solidifies the $H_2O$ resulting in each of the three components of the waste stream into separate phases. These three phases may then be separated physically, to provide water, argon and carbon dioxide. Specifically, as the exhaust stream flows through the compressor 200, the pressure of the fluid increases to the point where $H_2O$ becomes solid, and the stream is then flowed through a separator 202 such as a conduit having tines or screening therein which traps the solid $H_2O$, and the argon is bled off through a conduit 204. The remaining $CO_2$ is flowed out of the compressor 200, and into a storage container 27 (in FIG. 1, via port 206 or directly to the biomass for the recovery of oxygen therefrom. When stored in the container 27, the $CO_2$ may be released, sold, used to cool the ice water chiller 24 (FIG. 1) on the input side of the power generator, fed in gaseous form to the biomass, or a combination of these features. Where used to as a coolant for the $CO_2$ air chiller 28, such that air may be passed through the chiller 28 to be cooled thereby, and thence flowed to the N2 air chiller 6, which in turn transfers cooled air to the Cryogenic $O_2$ separator unit 1 where the $O_2$ is separated from the air at about −170C. The $H_2O$ that is recovered is passed to the ice/water air chiller 24, where air is passed thereover through a heat exchanger integral thereto, and the water is then routed to the water tank where it is stored and pumped, by water pump 26, to the coolant passages of the engine. The argon is returned to the argon tank 7.

Figure 7:
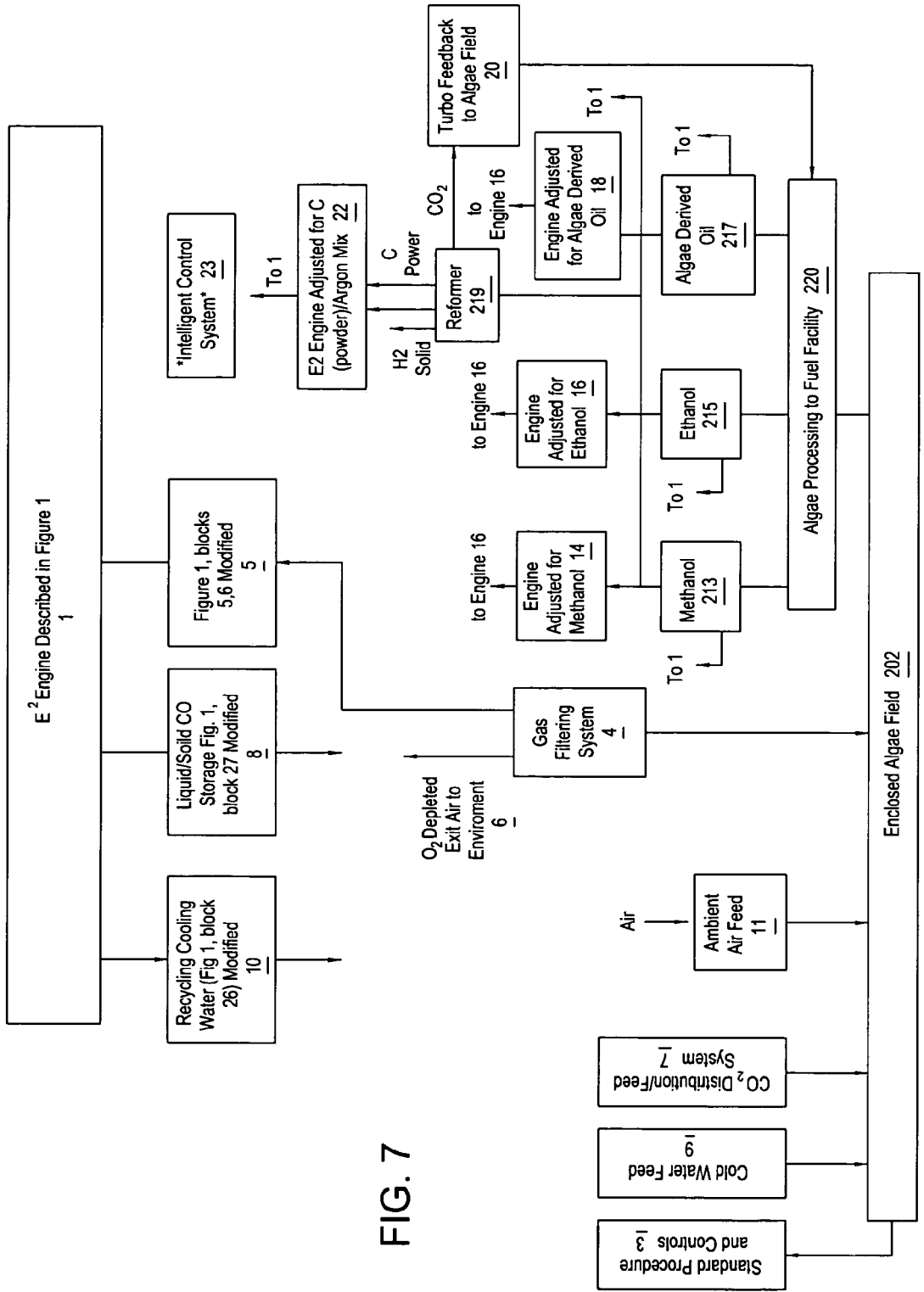
FIG. 7 is a schematic view of a biomass recover scheme useful in an embodiment of the power generator of FIG. 1.

Referring now to FIG. 7, the conversion of the $CO_2$ to form oxygen for reuse in the engine 16, a biomass converter 220 is provided. The biomass converter is preferably an enclosed algae field 202, over which the $CO_2$ is released for photosynthesis. As photosynthesis progresses, in the presence of sunlight water and a $CO_2$ enhanced ambient, Oxygen is released as the $CO_2$ is converted to a carbon based mass, i.e., algae. The use of the $CO_2$ to provide enhanced algae growth provides synergistic use of the $CO_2$, as the algae converts, through photosynthesis, the $CO_2$ into carbon based bulk algae and oxygen, and the algae may be revived and fermented to form methanol for use as a fuel for the power generator. In this embodiment, the algae field may be provided by locating algae in a plurality of transparent tubes composed of glass, plastic or the like, and preferably orienting the tubes vertically, to increase the quantity of sunlight reaching the algae. The tubes have opposed ends such that $CO_2$ is flowed in at one end such that, as the algae grows, the ambient at the introduction ends is nearly 100% $CO_2$, and as the $CO_2$ flows to the opposed end of the tube, the $CO_2$ content is reduced, and the $O_2$ content increased. Additionally, water from the cooling water tank 25 (FIG. 1) may be used to provide water to the algae field 202 to make up for evaporation or other water losses therefrom.

Several methodologies are currently feasible for the production of fuel from algae. For example, methane may be produced therefrom via biological or thermal gasification. The biomass may be fermented, thereby forming ethanol. It may be burned directly. It may be pressed to release the oils therefrom and those oils may be transesterfied, in which the triglicerols therein are reacted with a simple alcohol, to form alkyl ester, which is commonly known as biodiesel. Additionally, it is known that certain green algae will, when subjected to an anaerobic environment, produce hydrogen, which may be recovered and used as a fuel.

Once the oxygen enriched gas stream has passed from the end 210, the gas stream is then flowed to a mechanical filtering system 4 removing some of the nitrogen and $CO_2$ from the oxygen emitted from the algae field. Such filter are commercially available, and while not purifying the oxygen for use it creates an it is effectively enhance oxygen air with is ported to the Nitrogen Air Chiller 6 and Air Selection Valve (both in FIG. 1).

In an additional embodiment, the methanol, ethanol and/or algae oil streams 13, 15, 17 may be directed to a reformer 219, to convert the streams into constituent elements, including $H_2$, $CO_2$, $H_2O$ and carbon, as well as an output of power. Each of these constituents may be reused by being recycled back into the biomass 202, used as cooling water for the engine, or sold for value.

Referring now to FIG. 8, there is shown a table showing the relative efficiencies of the power generator of the present invention, in comparison to another power generation scheme, specifically a gas turbine power generation scheme. In this Figure, the power generator of the present invention is referred to as an $E^2$ engine. Specifically, FIG. 8 compares the electrical generation efficiency of the $E^2$ Engine, operating in a diesel combustion mode as discussed herein with respect to engine 16 being the combustion engine, with a Combined Cycle Gas/Steam Turbine system. The Combined Cycle Gas/Steam Turbine system is used as the reference because it is currently the most efficient commercial electrical generation system.

The bottom line comparison can be understood by looking at the potential efficiency of the power generator hereof. The potential of the power generator of the present invention is 57% efficient compared to the Combined Cycle, Gas/Steam Turbine system which is rated at 55% efficiency. It should be noted that the bottom line efficiency presented is the efficiency at the user location. The efficiency takes into consideration transmission losses at the user location. Because the power generator of the present invention is a zero emission engine it is possible and practical for it to be located at a large user location in urban and even downtown environments. This placement is not acceptable for Combined Cycle because of the $NO_x$ and $CO_2$ emission.

If the transmission losses were not considered an integral part of the analysis, and in the case of the power generator hereof, the 1% amount of loss was added back into the output of the power generator hereof, then the efficiency for some typical large size engine (on the order of 300MW) would be 58%, and the efficiency of the Combined Cycle engine would be on the order of 60%. Thus, one may say that, excluding transmission inefficiencies the Combined Cycle engine is slightly more efficient than the power generator hereof.

However, the comparison between the two engines performed in the above manner is inadequate because the power generator of the present invention is a nearly zero emission engine while the Combined Cycle engine may be clean when compared to conventional engines, but compared to the power generator of the present invention it is a major contributor to $NO_x$ and to greenhouse effects by emitting $CO_2$. If the Combined Cycle system were to be modified, and a final stage added to absorb and reduce the $CO_2$ release to near zero, this would cost the Combined Cycle engine an approximate 10% drop in efficiency with no economic means to reduce $NO_x$ emissions to zero. Thus, the Combined Cycle system, the most efficient of today's systems, has an operational efficiency of 50% when normalized to a Zero $CO_2$ emissions, but has a major, non-correctable disadvantage in the $NO_x$ emissions area.

For comparison, assuming the power generator of the present invention is using a diesel combustion cycle, which uses the better current techniques that are achieving approximately 49% efficiency. The additional use of high-pressure fuel injection amplification increases the efficiency by another 3% bringing the overall engine efficiency to (49%+3%) 52%. The higher combustion temperature resulting from the enhanced $O_2$ environment and the use of argon instead of nitrogen increases the overall efficiency of engine operation by 12%+52%=64%. The energy gain from the downstream heat recovery in rotary engines 132, 132' adds approximately another 12% to the overall useful work from the engine or 12%+64%=76%. The losses in efficiency associated with the production of reasonably pure $O_2$, and the separation and precipitation of Argon, $CO_2$ and $H_2O$ is approximately 18%, reducing the overall efficiency or 76%–18%=58%. If the power generator of the present invention is located at a remote site for electricity generation, and additional 1% of losses should be expected, resulting in 58%–1%=57% efficiency.

In another aspect of the invention, the power generator of the present invention may be used in two operating modes, a non-recycling mode, i.e., where the exhaust stream is ultimately vented to the ambient surroundings and a zero, or near zero, emission mode. This is useful where, for example, the power generator is used to power a mobile vehicle, but is also used to provide power in a stationary location.

Figure 9:
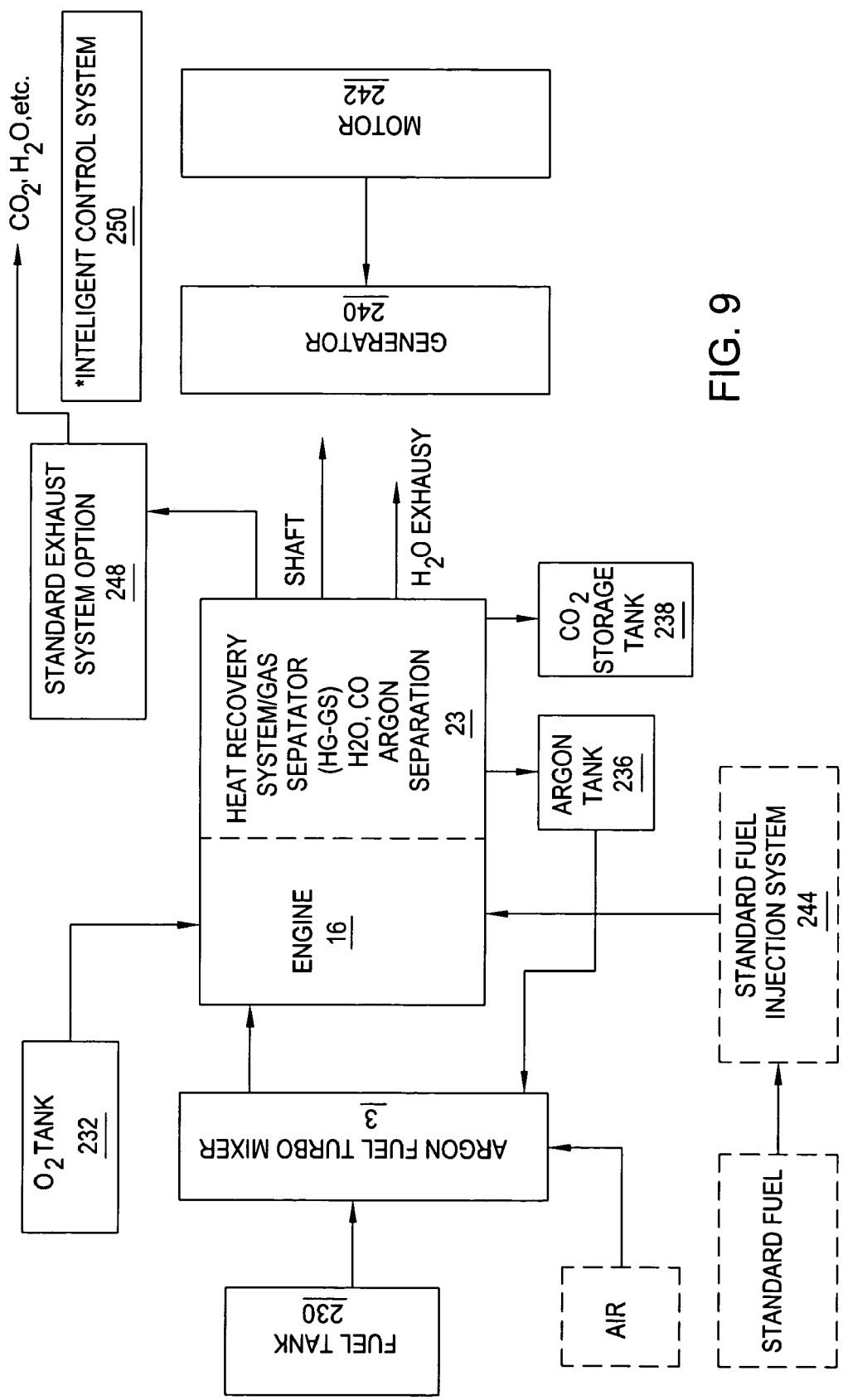
FIG. 9 is a schematic representation of an additional implementation of the power generator of FIG. 1.

Referring now to FIG. 9, there is shown in Block diagram form the operational aspects of this dual mode use of the power generator hereof. In the first operational, Zero Emission mode, the power generator operates as described in conjunction with FIGS. 1 to 6 herein, with the following changes: To be consistent with the discussion above, methane or natural gas, with a very low or effectively zero $N_2$ content will be the assumed fuel (Hydrocarbons, $C_xH_y$, $H_2$ or $C_2$ powder mixed with Argon could alternatively be used). However, the methane or low $N_2$ content natural gas will be contained in a relatively small vessel fuel tank 230 containing sufficient capacity to comfortably cover a specific distance of normal daily or weekly travel. Instead of being produced locally, $O_2$ in vehicle applications will be stored onboard in an $O_2$ Tank 232 (except in an application where space and economy enable the use of on-board oxygen generation, such as on a ship or train). The quantity of $O_2$ stored in the $O_2$ tank 232 will be sufficient to burn, i.e., combust with, in the combustion chamber 18 of engine 16 of FIG. 1, the amount of fuel in the Fuel Tank 230. The fuel from fuel tank (1) and argon from argon Tank 234 are mixed in the Turbo Mixer 10 and drawn into the engine 16 as described in the figures above. The mixed gases are combined with the injected $O_2$ from the $O_2$ tank 232 in the combustion chamber 18 as described in FIG. 1. The exhaust gases and the engine cooling water from the engine 16 enter into the engine heat recovery and gas separator system 23 as described in the forgoing Figures. However, in the present case, the $H_2O$ exiting the Heat Recovery/Gas Separation System 23 could be either stored and usefully disposed of after the trip or released to the atmosphere. The preferred embodiment would be to release the water into the atmosphere to evaporate into the air instead of carrying the relatively high weight, low value cargo. The Argon emitted from the Heat Recovery/Gas Separation System would be returned to the Argon Tank 236, and the $CO_2$ would be returned to the $CO_2$ Tank 238. The $CO_2$ storage conditions could be adjusted to store the $CO_2$ in solid or liquid form with the preferred embodiment being the lighter of the two alternatives. The $CO_2$ Tank 238 would be sized in a manner consistent with the sizing of the Fuel Tank 202 and the $O_2$ Tank 232. The rotary motion of the shafts of the engine 16 and engines 132, 132' could be used to power the vehicle directly, or in an additional aspect the engine is used to power a Generator 240 and then a Motor 242 which will be used to power the vehicle in a hybrid mode known to practitioners of the art. All of the above-described operations would be under the control of an Intelligent Control System 250 as will be described further herein.

In Operational Mode 2: Standard Driving Conditions. The above described vehicle engine is used as a standard engine consuming ordinary available fuels and running with generally available efficiency and emission levels. In this mode of operation, Air is moved to the Turbo Mixer 10 instead of methane or low $N_2$ level natural gas, and Argon is transmitted to the engine 16 using the air received and compressing it into the combustion chamber of the engine instead of the noble gas/fuel mix as would be the case in Operational Mode 1. The operational performance of the Turbo Mixer 10 will be adjusted under the control of the Intelligent Control System 250. It will adjust the operation to best known control practices as an air turbo engine feed. Standard fuels such as gasoline or diesel will be fed into the engine 16 based on the type of engine used, i.e., spark or compression based. In this mode of operation, the gasoline or diesel fuel will be injected into the combustion chamber 18 through a standard readily available $2^{nd}$ gasoline or diesel fuel injection system 244. The standard fuel Injector system 244 parallels the $O_2$ fuel injection system which is utilized in Operational Mode 1. Once again, the Intelligent Control System 250 would operate the fuel injection and combustion controls in an optimum manner. During Operational Mode 2, the engine heat recovery and gas separator system 23 will be physically and functionally engaged with the engine 16, and the exhaust gases from the engine heat recovery and gas separator system 23 would exit through a standard exhaust system 248 with standard catalytic converters etc.

Referring again to FIG. 1, in standard block diagram form an intelligent control system 250 is operably connected to each of the operational components of the power generator of the present invention, as well as to sensors of pressure and temperature disposed in intermediate locations, such as the inlet manifold of engine 16, the outlet manifold thereof, the inlets and outlets of engines 132, 132, the separator 202, as well to the inputs to the engine 16, such as the water chiller, N2 chiller, etc. Additionally, the output shafts of the engines 16, 132 and 132' will include speed and torque pickups, the output of which is operably coupled to the control system 250. Thus, the control system receives signals corresponding to the operating conditions of the engine to enable intelligent choices in fuel-$O_2$ mixing, fuel and O2 supply rates, argon inlet rate, etc. Likewise, the outlet or exhaust of engine 16 may include one or more sensors therein to measure the presence and quantity of oxygen, nitrogen, etc., emitted from engine 16.

To convert the energy of the fuel and oxygen mixture and heat generated thereby into useful energy, the output shafts of the three engines, engines 16, 132 and 132', are preferably linked to a gearbox 254 or transmission, and then further connected, from an output shaft of the gearbox, to a generator for the generation of electricity. The output shafts may be separately linked to the gearbox 254, or the output shaft of engine 16 linked to one side of the shaft 140 of engine 132 and the output side of shaft 140 linked to the input side of shaft 140' of engine 132'. The output side of shaft 140' would then be linked to the gearbox 254. The gearbox 254 is likewise controllable by the control system 250, such as through the operation of solenoids or other electrically or pneumatically operated methods, to change the relative speed of the input(s) to the gearbox 252 through the interposition of different ones of sets of gears on the input and output sides thereof. Thus, the speed and torque of the output shaft of the gearbox 252 may be adjusted to address changing conditions downstream of the generator and thus match the output of the generator to electrical loads. Simultaneously, in this aspect, the quantity of the fuel and oxygen reaching the engine 16 may be adjusted to increase or decrease the energy discharged therefrom through its output shaft, thereby further enabling the matching of the generator 254 to any downstream electrical load. The output of the generator 254 may be used to provide local power to a home, building, etc., or it may be input into the local electric grid. Furthermore, where the power generator of the present invention is used to power a large mobile vehicle, such as a ship, the output of the gearbox 252 may, with appropriate backlash and other drive train components, be directly coupled to a propeller.

Although the present invention has been described herein primarily as used in conjunction with methane as a fuel, other fuel options are specifically envisioned. Ethane or a combination of ethane and methane, deliverable to the power generator of the present invention in gaseous or vapor form, are readily interchangeable and combinable for intake into what would otherwise be the "air" intake of the engine 16. The methane and/or ethane are readily provided from source of natural gas where the source has a low N content, from natural gas after filtering N therefrom, or from the algae field. Additional fuels may be used, and if so, certain modifications may be necessary to introduce them into the engine 16 combustion chamber 18. For example, diesel fuel or gasoline having a low nitrogen content, or filtered for a low nitrogen content, could be introduced to the combustion chamber through an injector, in which case only argon need be introduced through the intake manifold.

Figure 10:
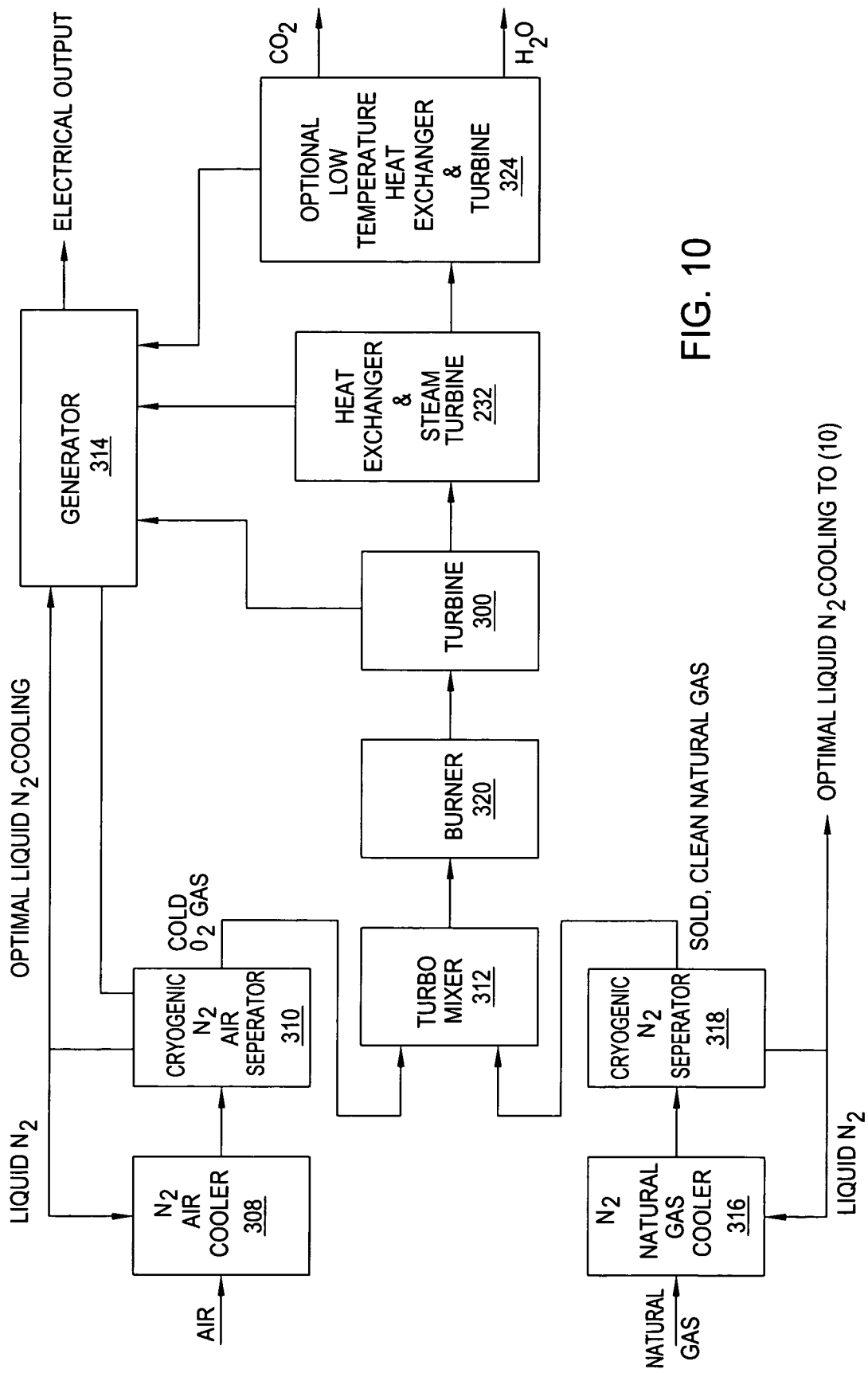
FIG. 10 is a schematic representation of an additional power generator system.

Referring now to FIG. 10, there is shown an additional embodiment of the invention, wherein oxygen and a fuel are combusted without the use of the carrier gas as described herein with respect to FIG. 1 to 9. In this embodiment, a turbine 300, typically configured as a gas turbine 300, is used as the primary extractor of energy produced in the combustion of a combustion gas, in this aspect oxygen, and a fuel, in this aspect natural gas. Referring to FIG. 10, the power generator includes an intake section 302, in which the oxygen and fuel are preprocessed, a combustion and power generation section 304 and a downstream extraction system for the extraction of additional energy from the exhaust stream, and the separation of the exhaust gas into its individual components. Additionally, a biomass may be used, in conjunction with the $CO_2$ from the exhaust, to absorb the $CO_2$ and accelerate biomass growth and to produce via photosynthesis oxygen which when bubbled through the water exits the exhaust of the enclosed algae growing environment forming oxygen enriched air. The enriched oxygen air is fed into the intake section of the power generator and reducing the energy required to extract the oxygen need for down stream processing.

Intake section 302 includes $N_2$ Air Cooler 308, into which air from ambient surroundings is introduced and cooled before the air enters the Cryogenic $N_2$ Separator 310 after which the oxygen is introduced to a turbo-mixer 312, in this aspect a turbocharger. The remaining components of the cooled air, primarily $N_2$, $H_2O$, and $CO_2$ are then circulated optionally to the Generator for cooling down the Generator 314 to low temperatures reducing the thermal loss IR resistance potentially to zero using superconductor materials. The $N_2$ may then be recirculated to the coolant side of the heat exchanger forming the $N_2$ Air Cooler 308. Alternatively the liquid $N_2$ might be fed directly back to the air inlet side of the $N_2$ Air Cooler 308. In parallel to the separation of $O_2$ out of the air through precipitating out the $N_2$ and trace components from $O_2$ in the air, a similar operation takes place with the natural gas, wherein the natural gas is fed into a separator, likewise a heat exchanger in which the natural gas is fed through one side thereof, and a liquid having a temperature below the boiling point of nitrogen is flowed through the other portion thereof, such that nitrogen and natural gas without nitrogen are recoverable therefrom in separate streams. Natural gas enters and is pre-cooled in the $N_2$ Natural Gas Cooler 316 before entering the Cryogenic $N_2$ Separator 318 where the $N_2$, $H_2O$ and $CO_2$ and other low liquefaction trace elements are separated from the natural gas fuel elements mostly methane and ethane. The liquid $N_2$ and other trace elements are then circulated optionally to the Generator 314 for cooling down the Generator 314 to low temperatures thereby reducing the thermal loss IR resistance potentially to zero using superconductor materials and then feeding back the $N_2$ coolant to the $N_2$ Air Coolers 308, 316, alternatively the liquid $N_2$ might be fed directly back to the $N_2$ Air Cooler 308, 316. The $O_2$ emanating from the Cryogenic $N_2$ is fed into the Turbo Mixer 312. Alternatively the separation of $N_2$ from both the $O_2$ in the air and from the natural gas can be all made using one pre-cooler station and one Cryogenic Separator for the two functions. However for safety reasons and certain optimizations that may be possible by uses separate paths the preferred embodiment is describes two separate channels for separating out the $N_2$.

The cold $O_2$ and natural gas are fed into the Turbo Mixer 312 in correct proportions and from there into the Burner 320. The high temperature high pressure gases, higher temperature are then passed through the Gas Turbine 300, in the usual manner producing torque to turn the Generator 314, the exhaust gas from the Gas Turbine 300 is fed into the Heat Exchanger and Steam Turbine 322 which services as a heat recovery system adding to the Generator 300 torque. An Optional third stage Low Temperature Heat Exchanger and Turbine 324 is shown. A Gas Turbine Combined Cycle system normally would not have a third level heat recovery stage. However the most preferred configuration feeds the $CO_2$ and $H_2O$ into an associated algae growth environment as described in FIG. 7 hereof with necessary modifications in temperature control and other issues which are obvious to someone skilled in the field. In this embodiment it is required to have the $CO_2$ and $H_2O$ enter at relatively cool temperatures, therefore it may be economically advantageous as part of the process to add what would normally be considered an added heat recovery stage to the system. The power generator of FIG. 10 is also provided with a control system, the operation of which was described with respect to FIG. 1 hereof.

Use of the Power Generator for "Solar" Aplications

The power generator of this aspect is also suitable for use in conjunction with SEGS, wherein the power is generated with the same or similar, low emissions resulting from solar energy. Likewise, where a solar facility, such as the SEGS facility employing simple boiling, is used in conjunction herewith, simultaneous power generation with the fuel and solar generation can result in a net doubling of output power and may be accomplished economically during peak generating requirement periods. Another aspect in order to meet the established criteria of being considered a solar power station of double the initial capacity for purposes of being classified a SEGS plant it is necessary to be able to operate the entire double capacity at least for some period of time. With the aspect of the algae field and algae produce clean solar burning this could be accomplished simply by running one full set of capacity on algae solar fuel. In the absence of algae solar fuel, the plant could be run as a double plant by storing sufficient heating fluid, so that for some portion of the peak hours, one full rated steam turbine could be run from the solar field heating fluid flow, and the other could be run from the stored heating fluid.

Where, as described with respect to FIG. 10, 100% $O_2$ and fuel mix is used to power a gas turbine there are benefits from reduction in CO, NOX, and other emissions with marginal reductions in emissions and efficiency and a meaningful increase in power. In FIG. 10 the $N_2$ is shown to be removed from the natural gas by precipitating the nitrogen at the liquefaction temperature of $N_2$ or somewhat lower. $N_2$ appears in normally available natural gas deposits at levels of mere trace quantities to quantities in excess of 15%. The form of filtering the unwanted $N_2$ out of the natural gas as described with respect to FIG. 10 at the same time lowers the temperature of the input gas, which is desirable for efficiency and power output reasons. In a similar manner the $N_2$ is removed from the $O_2$ in the air by lowering the air temperature to the levels required to liquefy the $N_2$ and precipitating it out from the oxygen in the air. The lower temperature of the natural gas and the $O_2$ combined with the elimination of the nitrogen allows large quantities fuel and oxygen to enter the compressor (turbo mixer 312), at lower parasitic losses than with less combustible substances in normally operations. This filtering method also has the added effect or lowering the temperature of the $O_2$ into the combustion cycle which positively impacts the efficiency and power output of the gas turbine. The same method for separating the $N_2$ from the both the natural gas and the air can be used in power generator described in FIG. 1. Alternatively the methods described in FIG. 1 of lowering the temperature of air to low enough temperatures to first precipitate out the $N_2$ in the air and the liquefy the $O_2$ so that it can be handled more efficiently down stream as a liquid, and a corresponding process of lowering the natural gas to liquefy the natural gas and gain down stream benefits associated with handling the fuel as a liquid can be applied as alternative means of supplying fuel to a Burner 320, through an alternatively designed pre-combustion liquefied natural gas, liquefied $O_2$ mixing and fuel injection systems. The various designs may be alternatively considered in different circumstances, especially considering much natural gas is being shipped in liquefied form. This near zero to zero emission combustion technique may be used to establish the plants near the unloading facility of the liquefied natural gas and thereby benefit from the energy and capital expenses already being applied to liquefy the fuel source. In addition to the liquefaction methodology, mechanical filtering out of $N_2$ from natural gas and from $O_2$ in the air are possible, the latter are being evaluated in the automotive field in enhanced oxygen combustion testing.

The reduction of NOX, CO, and other emissions to effectively zero emission levels allows the emission of these engines to be fed into algae and another growth processes to accelerate the growth cycle feed gases from less clean system could have possible negative effects with unacceptable toxin levels along with the useful and positive impact it should have on accelerating growth.

Where, as is described herein with respect to FIG. 10, a 100% $O_2$ and fuel mix is used to power a gas turbine, there are benefits not only from reduction in NOX and CO, but with improved uniformity in over the year output capacity of the system which is quite advantageous in certain applications. This configuration may substantially increase the power emanating out of a same size turbine and burners system using traditional air fuel mixtures in standard gas turbine and combined gas turbine systems. The system does this compared with conventional competing combined cycle gas-steam turbine systems with marginal changes in efficiency which at times are positive and at times negative depending on precise designs of the two systems.

The gain in power output capacity stability results from the fact that in standard gas turbines and combined cycle gas-steam turbine systems efficiency and power are based to a large extent on the input ambient and the combustion temperature of the system. Changes in operating temperature not only change the theoretical thermal efficiency in addition they effect plant design, which is optimized for one operation condition or another. While the combustion temperature is usually fixed at optimized levels for the system, the ambient temperature can change between day and night and between summer and winter by as much as 50° C. or more, thereby varying the output of the plant by 2% to 4%. An inlet temperature dependant drop in output capacity thus typically occurs during the summer months during the daytime hours. These happen to be precisely the hours when many regions require the maximum output from their plants to meet the need of summer air conditioning. This summer air-conditioning load sets the requirements for new plant acquisition, usually inexpensive, low efficiency and relatively high emissions plants just to produce electricity to meet these needs.

There are gains and losses with respect to efficiency of the power generator hereof using a 100% $O_2$—fuel combustion system compared with competing combined cycle gas-steam turbine technology. As stated previously, on balance the two systems would run at about the same overall efficiency depending on precise design factors. This aspect of the power generator system loses certain operating efficiency by cooling the incoming fuel to precipitate out the $N_2$ from the combustion process, on the other hand the colder temperature of the incoming $O_2$ and natural gas reduces the parasitic losses of the air fuel intake turbocharger and/or compressor feeding the combustible mix to the burner and then to the turbine. The elimination of the $N_2$ as a working gas and which was not a combustion gas in the combustion cycle would for a the same quantity of gas/unit time entering the combustion cycle, now composed of, for example, only fuel and $O_2$, would produce substantially more heat per unit of time. Thus as a practical matter the quantity of $O_2$ and fuel supplied into the system per unit of time would not be made to fully substitute for the quantity of $N_2$ eliminated. But from the preceding it can be seen that increases of temperature and pressure are possible and clearly without the negative factor of added NOX generation. This increase in operating temperature and pressure will have a tendency to increase the efficiency of the system. The increased temperature and pressure increase the efficiency of the system.

Where the power generator uses a 100% $O_2$ and fuel mix and a conventional steam turbine recovery as the second stage of heat recovery, the only difference in this application to standard steam turbine heat recovery methods is that the operating combustion temperature and pressure would be somewhat higher and as a result, the input emission gases into the Heat Exchanger and Steam Turbine 232 would be somewhat higher and the temperature of the exit gases would be somewhat higher. Under standard operations not in conjunction with the use of an algae field for oxygen and biomass production, power generator would exhaust the gases from the steam-turbine to the atmosphere which would be non-toxic, all NOX essentially eliminated with other trace compounds, but $CO_2$ would be released along with water. If it is desired to eliminate the $CO_2$ and/or gain the other operational benefits from site produced fuel then it is necessary to feed the emission gases, $CO_2$ and $H_2O$ into the enclosed algae field. To do so it is desirable to cool the output emissions further and to recover some additional energy out of the waste exhaust heat. This can be accomplished using a Low Temperature Heat Exchanger and Turbine 324 such that the exhaust gases from the steam turbine boil Freon in a liquid state converting it to a gas state and drive a low temperature Freon gas driven turbine. Other gases and configurations are possible.

The power generator of FIG. 10 allows the construction of a combined cycle gas-steam turbine power plant to be used for converting solar produced thermal energy and certain amounts of natural gas to electricity, instead of using a steam turbine for converting the solar produced thermal energy and associated gas to electricity. The movement from a steam turbine to produce electricity to a combined cycle gas-steam turbine increases the conversion efficiency of the plant from approximately 40%+ efficiency to 60%+ efficiency. The power generator, together with the algae, forms a new solar generation technique meeting the statutory requirements of solar power generation. The power generator is a solar facility when the power generator (10) is run on algae derived fuel. This is appropriate because the fuel which powers the system comes from the incident sunlight energy and when this fuel is run in the power generator (FIG. 10) it produces clean energy, as clean as or cleaner than conventionally powered SEGS plant which over the years been classified as solar facilities. The power generator (10) fueled by algae solar fuel and allocated gas allowances may be cleaner than standard powered SEGS even though the prior art powered SEGS may burn less fuel annually because when the SEGS burns its allotted fuel it releases standard levels of NOX and CO, and other emissions, whereas the power generator (FIG. 10) burns more fuel during the year but with essentially zero emission level. Thus in the process algae fuel may be considered as a solar fuel, a intermediate stage in the solar electrical generation process. The algae produced fuel, say methane (the principle component in natural gas), would be used to power the gas turbine at from 2000° C. to 2500° C. These temperature as pointed out above are not attainable by commercially feasible non-biomass solar technology. The high temperature gas emanating from the gas turbine in turn is used to power the steam turbine. Thus the full capacity of the gas turbine plant can be run by solar alone and this allows classifying the full capacity of the plant as being solar and it does so in a natural and elegant manner. The prior art SEGS provided a clean (effectively) zero emission power generator, but could only, in commercial applications, produce temperature far below the levels required to run the Combined Cycle Gas-Steam turbine, and thus are unable to use the more efficient thermal to electrical conversion technology in their facilities. Once a facility as described herein with respect to FIG. 10 meets this minimal algae combustion burning time (i.e., run as solar for a specific period of time) the power generator (10) would be permitted to burn its allocated fossil fuel limits, and as much algae solar fuel as desired.

Where the power generation scheme described with respect to FIG. 10 is used to produce energy at a solar facility during the peak sun hours to meet peak user demand, the solar plant may provide a doubling of solar thermal output during peak hours simply by adding at very low cost a steam turbine and interconnection transformer and controls to the grid. Under the current invention the fuel burning would be considered a solar activity with the algae being provided as a solar fuel, as a minimum to meet the statutory requirements and perhaps for more extensive periods of time provided the cost of algae produced fuel is equal to or less than alternative commercially produced fuels.

It can be seen that the peak output of the basic initial SEGS station would be on the order of 5.5 times greater when converted into a power generated (FIG. 10 plant) with an associated algae field. The election to build this higher peak power plant instead of a conventional SEGS 9 only adds marginally to the capital cost, both for the solar field and power station. This combined improvement comes from two factors which are described as follows: Assuming the "name plate capacity" of the basic SEGS plant is defined as 1 SEGS output unit. During on peak hours, the waste heat of the gas turbine would be used to power the primary stations steam turbine. The gas turbine produces approximately 2 SEGS output units. The 2 to 1 ratio is generally the standard gas to steam turbine ratio. The SEGS solar field during this on-peak operation would power a separate steam turbine which would operate only during the on-peak hours and produces an additional 1 SEGS output unit. Thus from the initial SEGS steam turbine we get 1 segs output unit, from the gas turbine we get 2 SEGS output unit, and from the auxiliary on peak steam turbine we get 1 SEGS output unit, or altogether 4 SEGS output units. However in addition during the peak power period when the solar plants are operating as a combined cycle gas-stem plant is operating at 3 times normal output, the efficiency is approximately 50% higher from the bottom up, the 3 SEGS output units would be on the order up to 4.5 SEGS output units plus the 1 SEGS output unit for the plant working in the strictly solar mode. The amount of algae produced solar fuel that would have to be introduced into combustion cycle will need to sufficient to assure that all peak power needs are met with a reserve for none solar days without exceeding the 25% fuel burning limitation imposed by some funding agencies to maintain funding and other incentives for solar generation and covered with comfortable margin the full peak requirement.

It should be appreciated that the power generation scheme provided as described with respect to FIG. 10 is readily adaptable to be combined in several ways with a solar generation plat, such as a SEGS plant. For example, the power generator may be used to feed exhaust of the gas turbine to the steam turbine, while the SEGS solar facility can simultaneously, or at separate discrete times, supply superheated water from its storage tank to the steam generator, and thereby greater use of the investment of the facility is accomplished, with greater energy output. Likewise, the fuel used in the burner may include up to 25% fossil fuel in conjunction with, or separate from, the biomass fuel. Additionally, the biomass fuel may be recovered directly from an adjacent biomass field and facility, or recovered from a remote location and shipped or otherwise transported to the generation facility.

Use of the Power Generator for Low Emission Application

In addition to the use of power generators of the present invention for solar generation, the power generator of the present invention, in particular the embodiments of FIGS. 1 to 6 hereof, may be produced for vehicle-sized engines to very large power system sizes. The power generator hereof, when operated in the manner described, produces energy and power at higher efficiency and lower emission levels, and at a higher reliability than competing diesel and gas turbine systems. The power generator of the present invention differs from existing state of the art combustion engines in the following important ways:

Most engines burn fuel in normal air environments using the approximately 21% oxygen level in the air to enter into a chemical reaction with the selected fuel. The power generator of the present invention uses enriched $O_2$ combustion.

A diesel engine as described with respect to FIGS. 1 to 6 hereof uses enriched $O_2$ combustion which would begin with a 35% $O_2$, 65% Argon mix, and then the mixture would be modified to optimize the engine performance, probably increasing the percentage of $O_2$ to Argon as more familiarity and experience with control is gained. The first described embodiment uses Argon as the noble gas and uses an $O_2$, Argon (Ar) fuel mix as a combustion environment rather than an $O_2$, $N_2$, fuel mix, which occurs when air is used. The gaseous mix with Argon, instead of $N_2$, reduces $NO_x$ emissions to near zero, the quantity limited only by the level of purity of the fuel for no nitrogen therein, and any leakage of ambient air into the system. The result is a near zero undesirable emissions engine instead of a zero emission engine because, as a practical matter, trace amounts of nitrogen will remain in the $O_2$— Ar mix, and as a result, some portion of the trace amounts of $N_2$ will oxidize in the combustion process. Also, small amounts of $N_2$ will most likely appear in most of the fuels used. Careful handling of the $O_2$ and Ar separation and mixing process, and careful selection and handling of the fuels, should allow $N_2$ in the system to be reduced to less than 1% of the amount found in the standard combustion process.

The 35% $O_2$/65% Ar mixture benefit not only reduces $NO_x$ emission, it also increases engine output power above a factor of two and further increases efficiency. Note that the invention is not limited to a 35%/65% mix. Various mix ratios are possible and the optimum point will very from engine configuration to engine configuration. There will be a tendency to improve performance by increasing the $O_2$ to Argon ratio. The 35%/65% ratio is used because of the published experience, as set forth in the background hereof, of diesel engines operating in 35% $O_2$ enriched air environments, but one skilled in the art will appreciate that other ratios may be appropriate. The use of the an $O_2$/Ar mixture provides another efficiency improvement due to the presence of Ar, noble (mono-atomic) gas in the combustion cycle gases instead of a di-atomic compound like $N_2$, where a portion of the energy produced is lost in the excitation of the duo-atomic N—N bond. The combustion efficiency associated with this substitution increases on the order of 12% (for a 65% Ar substitution for $N_2$). This efficiency gain results from removing the di-atomic gas, which itself absorbs approximately 12% of the combustion heat and wastefully throws the absorbed heat into the atmosphere, without expending the thermal energy on useful work. The single Ar atom does not suffer from heat absorbent internal oscillation between the di-atomic compounds and does not produce losses associated with the inter-atom oscillation. The result is a proportionally higher available efficiency engine. Additional gains will also be achieved due to higher operating temperatures.

Using a highly enriched oxygen environment in the combustion chamber assists in efficiency because it results in higher combustion temperatures and increases power because it allows greater amounts of fuel to be burned in each combustion cycle. However, the higher temperature and pressure creates certain instability in the combustion cycle. This invention overcomes these instabilities by utilizing multivariable modeling and control techniques that model the combustion timing, uniform expansion, the useful contribution of each combustion cycle to the uniform forward movement of the engine, the completeness of combustion, etc. The models are updated on the basis of ongoing testing (Design of Experiments, DOE) and normal running operations on the engine as a whole. Design of Experiments models each cylinder, and/or expansion chamber, and/or mixing chamber, and/or fuel variant that is used throughout the intake system through the fluid handling system, through the combustion cycle, through the heat recovery, and the exhaust systems. These models are then used to optimize the operation of the system as a whole by controlling the state of the composite collection of lower level subsystems to achieve the overall optimized control objectives based on historic understanding collected from the data and mathematical extrapolations. This invention utilizes the public domain modeling, control, and optimization techniques like neuro-nets and genetic algorithms, and the InSyst proprietary yield optimization technology (patent number) to control, stabilize, and optimize this cycle and system inclusive of its collection of subsystems.

In order for the exhaust gases to be as emission free as possible, the lubricating oil used between the cylinder and the piston, which enters the combustion cycle, must be eliminated. To accomplish this, an exceedingly low friction, long lasting, precision cylinder and piston surface are desirable. Such materials like alumna oxide and/or diamond coated alumna oxide may be employed. While the power generator hereof based upon engine 16 operating as a diesel engine is able to work without the low friction piston and use lubricants instead, as is traditionally done without affecting the efficiency objectives, the inclusion of the lubricant would somewhat increase emission levels and make it more difficult to obtain or meet a possible statutory zero emission standard.

While heat recovery cogeneration systems are commonly used in conjunction with gas turbines these systems are not commonly used in conjunction with internal combustion engines, especially diesel engines, because the high percentage of useful energy extraction results in relatively low temperature of emission gases, which is not typically converted at economically worthwhile costs into additional electricity. The power generator described herein is applicable for both internal and external combustion engines. However, in this invention, unlike standard internal combustion engine applications, the heat recovery and gas separation system is an economically useful part of the system as a whole. This is true in part because of the inventive use of the heat recovery system as both a heat recovery system and a gas separator, in part due to the higher temperature of the exit gases of the engine because of the higher temperature combustion cycle, in part because of the need to recover the Argon from the exit gases and re-circulate it back into the combustion cycle, and in part because of the high value in the preferred embodiment of using the $CO_2$ exiting the combustion cycle to accelerate growth of algae, which in turn is used locally to produce fuels for the engine itself. When fuel is burned in an $O_2$/Ar gaseous environment, the post combustion exhaust gases consist of mostly Ar, $H_2O$ (water), $CO_2$ and small amounts of unburned $O_2$. Because Ar is costly and not readily available, the power generator hereof includes an integral means for extracting the Ar from the exhaust gases, and allows the Ar to recycle into a new combustion cycle. The heat recovery system Stage 1 of the Heat Recovery and Gas Separation System extracts heat from the exhaust gases through volumetric expansion. Stage 2 of the Heat Recovery and Gas Separation System receives the reduced temperature gases from Stage 1 and through additional volumetric expansion reduces the exhaust gases from Stage 2 to temperatures below $-40°$ C., typically on the order of $-50C$., the liquidification level of $CO_2$, and much below the liquidification level of water. Stage 3 of the Heat Recovery and Gas Separation System (FIG. 4) separates the three substances into Ar, which remains in the gaseous state, water, which largely becomes ice and the $CO_2$ which is largely liquid through a heat exchanging and compression process. The separation is done by taking advantage of the phase and weight differences through a multiplicity of available means. The water would precipitate from the exhaust gases and allow the Ar to be recycled into future combustion cycles. The $CO_2$ and water from the flue gases can in turn be separated. The cold/ice water can be used to satisfy certain local power generator needs, such as cooling of the engine 16. The preferred use of the $CO_2$ is to feed the algae in the enclosed and controlled algae field, where the algae are grown and thereafter processed into fuels for use in the power generator hereof and other applications. In the absence of associated algae fields other commercial uses for the $CO_2$, like use in beverages and other uses, will be found so that the $CO_2$ production from the engine does not contribute to increases of $CO_2$ into the atmosphere. The Argon emanates from the Gas Separator in a gaseous state and is circulated back to the Argon tank and used in future combustion cycles. The relatively small heat recovery system separates the three exhaust gases: Ar, $CO_2$ and $H_2O$ through a combination of phase change, weight separation, etc. While the system utilizes a small volumetric heat expansion system, commercially available heat recovery systems and gas separations systems may be alternatively used.

A preferred embodiment would involve using the $CO_2$ to feed through a piping system algae farm in the general vicinity. In this embodiment, it is envisioned that the oxygen emanating from the algae farm would be filtered out and piped in to the power generator site where it would be compressed and cryogenically cooled. Any $CO_2$ mixed into the $O_2$ would be separated and fed back to the algae farm through a return piping system. The $O_2$, together with any $O_2$ cryogenically separated from the air, would be placed in a tank for use in future combustion cycles. The algae at the algae farm would be processed into fuel and piped to the engine.

When the fuel produced from the algae or other agricultural process refinement is $H_2$ instead of methane, ethane, methanol, ethanol, or an algae derived oil, and the $H_2$ is used as the source of fuel for the power generator of the present invention, then $CO_2$ is a waste product of the $H_2$ production process and is in turn fed back into the algae growth cycle. The power generator using $H_2$ as fuel would operate on a simpler cycle mixing $H_2$ with Argon as a working gas-fuel mix. The heat recovery system design described above can be simplified making it necessary only to precipitate out the $H_2O$ and re-circulate the Ar into the combustion cycle. Alternatively, or in addition, the $H_2$, which is a processed refined fuel product of the algae growth process, can be used as a fuel in other more conventional fuel cell applications.

Vehicles, including cars, trucks, trains, and/or ships, could also be equipped with the power generator hereof. The power generator hereof used in vehicles can use any clean fuel. A clean fuel is a fuel that contains hydrocarbon substances with, at most, trace quantities of sulfur, nitrogen, and other potentially polluting substances. Filters may be placed between the fuel tank and the fuel injection system to filter out unwanted substances if the fuel is not sufficiently clean. The fuels can be either liquid or gas. If the fuel is a gas, it is mixed with the Ar as shown in FIG. 1, block 10. If the fuel is a liquid, it is injected into the combustion chamber through a high-pressure amplification fuel injector system, which would be set up in parallel with the pressure amplification liquid $O_2$ injection system. If hydrocarbon fuels are used, then the Heat Recovery and Gas Separation System will recover Ar, $CO_2$ and $H_2O$ by precipitation out of the exhaust gases. Alternatively, the power generator of the present invention may use $H_2$ as a fuel, like a fuel cell, by either storing $H_2$ on the vehicle or by using more conventional fuel on board and passing the fuel through a reformer and producing $H_2$. Once available, the $H_2$ used in the combustion operation is mixed with Ar, and thereafter passed through the Turbo Mixer and then fed into the air manifold and of the engine 16. In such a case, the Heat Recovery and Gas Separation System might be simplified. It would be designed just to precipitate out $H_2O$ and re-circulate Ar in the combustion cycle, significantly reducing the difficulty of the gas separation problem, and requiring temperatures to be dropped not far below ambient levels. When $H_2$ is used instead of hydrocarbons as fuel the power generator hereof would be a substitute for a fuel cell type of application where the fuel for the fuel cell is produced on board the vehicle. The vehicles so equipped would, as opposed to fuel cells, have $O_2$ and $H_2$, and optionally, $CO_2$ storage tanks available for some defined range of travel, where the $CO_2$ from the reformer is passed through the Heat Recovery and Gas Separation system and stored. In one aspect, the range of travel based on on-board storage vessels would be sized for standard daily travel. This is sufficient, for example, for travel back and forth from home to work but not more. For travel in excess of these distances, the storage tanks are equipped to handle more conventional fuels, ideally, using low or zero sulfur and near zero nitrogen containing diesel fuel. In addition, during the long-term trip mode of operation the power generator would use a conventional air intake and a parallel conventional exhaust system within the existing infrastructure for refueling. This would be environmentally competitive with other similar conventional mode engine times. It would also be environmentally clean for the more frequent and higher emissions, stop-and-go city travel. It is specifically contemplated that such a vehicle would operate either as a conventional vehicle or as a hybrid vehicle using the engine to produce electrical energy, which is used in conjunction with a battery to power the vehicle.

In one embodiment, the vehicle equipped with the power generator of the invention, operating as a zero emission or near zero emission engine, would be connected to $O_2$ supply, natural gas input supply, and a piping system which transports the separated $CO_2$ to locations where the $CO_2$ can be used for algae or other vegetation growth applications, or collected and distributed to a place or places where it can be used, thereby off-setting alternative $CO_2$ production requirements. Such interconnection systems could be set up at home, work, shopping center parking facilities, or the places where vehicles are parked for extended periods of time. At the locations where fuel, $O_2$, and collection of $CO_2$ facilities are available such vehicles, which are running at very high efficiency, and at essentially zero emission levels, could supply electrical power to those facilities in a very reliable manner and at very low cost.

While the foregoing is directed to embodiments of the present invention, other and further embodiments of the invention may be devised without departing from the basic scope thereof, and the scope thereof is determined by the claims that follow.

I claim:

1. A method of generating power, comprising the steps of:
   providing a combustion location;
   providing to said combustion volume a noble gas, a combustion gas and a fuel and;
   separating, from the exhaust of the combustion volume, at least the noble gas; and
   reusing the noble gas for introduction to the combustion volume.

2. The method of claim 1, further including the steps of:
   recovering $H_2O$ from the exhaust of the combusted materials of the combustion volume;
   reusing the $H_2O$ to provide cooling to the combustion chamber.

3. The method of claim 2, further including the steps of:
   providing a vehicle having a rotational propulsion input:
   providing an output shaft from the power generator
   coupling an output shaft of the power generator to the propulsion input.

4. The method of claim 3, where the vehicle is a ship, a train or a motor vehicle.

5. A method of generating power, comprising the steps of:
   providing a combustion location;
   providing to said combustion volume a noble gas, a combustion gas and a fuel;
   selectively excluding air from the combustion volume;
   combusting said combustion gas and fuel in the combustion volume;
   exhausting, from said combustion volume, an exhaust stream of the noble gas and the products of combustion of said combustion gas and said fuel;
   passing exhaust stream through an additionally energy recovery device; and
   recovering energy from the exhaust stream,
   directing the exhaust stream from the additional energy recovery device; and
   separating, from the exhaust stream including $CO_2$, $H_2O$ and the noble gas, the individual components thereof.

6. The method of claim 5, further including the step of providing the biomass generated biomass fuel to the engine.

7. The method of claim 5, further including the steps of:
   providing the noble gas and fuel to the combustion volume in a first mixture;
   separately providing the combustion gas to the combustion volume,
   providing oxygen as the combustion gas by removing the non oxygen species from ambient air.

8. The method of claim 5, further including the steps of:
   providing the noble gas and fuel to the combustion volume in a first mixture;
   separately providing the combustion gas to the combustion volume,
   supplying a source of purified oxygen as the combustion gas.

9. The method of claim 5, further including the steps of:
   providing a biomass generated biomass fuel to the engine
   providing the noble gas and fuel to the combustion volume in a first mixture;
   separately providing the combustion gas to the combustion volume.

10. The method of claim 9, further including the step of selectively supplying a mixture of air and fuel to the combustion chamber, rather than a mixture of fuel, noble gas and combustion gas.

11. The method of claim 10, further including the steps of providing a manifold in communication with the combustion volume and an injector in communication with the combustion volume.

* * * * *